US011349645B2

(12) United States Patent
Wright et al.

(10) Patent No.: US 11,349,645 B2
(45) Date of Patent: *May 31, 2022

(54) DETERMINING A COMMON SECRET FOR THE SECURE EXCHANGE OF INFORMATION AND HIERARCHICAL, DETERMINISTIC CRYPTOGRAPHIC KEYS

(71) Applicant: nChain Holdings Limited, St. John's (AG)

(72) Inventors: Craig Steven Wright, London (GB); Stephane Savanah, London (GB)

(73) Assignee: nChain Holdings Ltd., St. John's (AG)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,125

(22) Filed: May 11, 2020

(65) Prior Publication Data
US 2020/0274700 A1 Aug. 27, 2020

Related U.S. Application Data

(63) Continuation of application No. 16/078,630, filed as application No. PCT/IB2017/050856 on Feb. 16, 2017, now Pat. No. 10,652,014.

(30) Foreign Application Priority Data

Feb. 23, 2016 (GB) .................................. 1603117
Nov. 15, 2016 (GB) .................................. 1619301

(51) Int. Cl.
*H04L 9/08* (2006.01)
*H04L 9/30* (2006.01)
*H04L 9/00* (2022.01)

(52) U.S. Cl.
CPC ............ *H04L 9/0825* (2013.01); *H04L 9/008* (2013.01); *H04L 9/0844* (2013.01);
(Continued)

(58) Field of Classification Search
CPC ..... H04L 9/0825; H04L 9/0844; H04L 9/008; H04L 9/0861; H04L 9/3066;
(Continued)

(56) References Cited

U.S. PATENT DOCUMENTS 5,600,725 A   2/1997   Rueppel et al.
5,761,305 A   6/1998   Vanstone et al.
(Continued)

FOREIGN PATENT DOCUMENTS

AU      2016100059 A4   3/2016
CA         2867765 A1   4/2016
(Continued)

OTHER PUBLICATIONS

UK IPO Search Report dated Jul. 26, 2016, Patent Application No. GB1603114.8, filed Feb. 23, 2016, 5 pages.
(Continued)

*Primary Examiner* — Quazi Farooqui
(74) *Attorney, Agent, or Firm* — Davis Wright Tremaine LLP

(57) ABSTRACT

A method (300) and system (1) of determining a common secret for two nodes (3, 7). Each node (3, 7) has a respective asymmetric cryptography pair, each pair including a master private key and a master public key. Respective second private and public keys may be determined based on the master private key, master public key and a deterministic key. A common secret may be determined at each of the nodes based on the second private and public keys. In one example, a node (3, 7) may determine the common secret based on (i) a second private key based on the node's own master private key and the deterministic key; and (ii) a second public key based on the other node's master public key and the deterministic key. The invention may be suited
(Continued)

for use with, but not limited to, digital wallets, blockchain (e.g. Bitcoin) technologies and personal device security.

47 Claims, 11 Drawing Sheets

(52) U.S. Cl.
CPC .......... H04L 9/0861 (2013.01); H04L 9/3066 (2013.01); *H04L 2209/56* (2013.01)

(58) Field of Classification Search
CPC ..... H04L 2209/56; H04L 9/08; H04L 9/0838; H04L 9/30; H04L 9/00
See application file for complete search history.

(56) References Cited

U.S. PATENT DOCUMENTS

| | | | |
|---|---|---|---|
| 5,867,578 | A | 2/1999 | Brickell et al. |
| 5,889,865 | A | 3/1999 | Vanstone et al. |
| 5,896,455 | A | 4/1999 | Vanstone et al. |
| 5,933,504 | A | 8/1999 | Vanstone et al. |
| 6,061,449 | A | 5/2000 | Candelore et al. |
| 6,078,667 | A | 6/2000 | Johnson |
| 6,118,874 | A | 9/2000 | Okamoto et al. |
| 6,122,736 | A | 9/2000 | Vanstone et al. |
| 6,141,420 | A | 10/2000 | Vanstone et al. |
| 6,618,483 | B1 | 9/2003 | Vanstone et al. |
| 6,662,299 | B1 | 12/2003 | Price, III |
| 6,704,870 | B2 | 3/2004 | Vanstone et al. |
| 6,785,813 | B1 | 8/2004 | Vanstone et al. |
| 6,792,530 | B1 | 9/2004 | Qu et al. |
| 7,006,633 | B1 | 2/2006 | Reece |
| 7,095,851 | B1 | 8/2006 | Scheidt |
| 8,520,855 | B1 | 8/2013 | Kohno et al. |
| 8,522,011 | B2 | 8/2013 | Spalka et al. |
| 8,855,318 | B1 | 10/2014 | Patnala et al. |
| 9,209,980 | B2 | 12/2015 | Bowman et al. |
| 9,258,130 | B2 | 2/2016 | Hwang et al. |
| 9,298,806 | B1 | 3/2016 | Vessenes et al. |
| 9,350,549 | B2* | 5/2016 | Lumb ................... G06F 16/185 |
| 9,673,975 | B1 | 6/2017 | Machani |
| 10,050,779 | B2 | 8/2018 | Alness et al. |
| 10,068,228 | B1 | 9/2018 | Winklevoss et al. |
| 10,510,053 | B2 | 12/2019 | Armstrong |
| 10,516,527 | B1 | 12/2019 | Machani et al. |
| 10,659,223 | B2 | 5/2020 | Wright et al. |
| 10,719,816 | B1 | 7/2020 | Kurani |
| 11,115,196 | B1 | 9/2021 | Triandopoulos et al. |
| 2001/0050990 | A1 | 12/2001 | Sudia |
| 2002/0112171 | A1 | 8/2002 | Ginter et al. |
| 2002/0198791 | A1 | 12/2002 | Perkowski |
| 2003/0026432 | A1 | 2/2003 | Woodward |
| 2003/0046202 | A1 | 3/2003 | Knapp |
| 2003/0048906 | A1 | 3/2003 | Vora et al. |
| 2003/0188153 | A1 | 10/2003 | Demoff et al. |
| 2004/0030932 | A1 | 2/2004 | Juels et al. |
| 2004/0049687 | A1 | 3/2004 | Orsini et al. |
| 2004/0078775 | A1 | 4/2004 | Chow et al. |
| 2004/0111484 | A1 | 6/2004 | Young et al. |
| 2004/0193890 | A1 | 9/2004 | Girault |
| 2005/0071283 | A1 | 3/2005 | Randle et al. |
| 2005/0138374 | A1 | 6/2005 | Zheng et al. |
| 2006/0023887 | A1 | 2/2006 | Agrawal et al. |
| 2006/0153368 | A1 | 7/2006 | Beeson |
| 2006/0156013 | A1 | 7/2006 | Beeson |
| 2006/0161485 | A1 | 7/2006 | Meldahl |
| 2006/0179319 | A1 | 8/2006 | Krawczyk |
| 2006/0248114 | A1 | 11/2006 | Anderson et al. |
| 2007/0055880 | A1 | 3/2007 | Lauter et al. |
| 2007/0192842 | A1 | 8/2007 | Beaulieu et al. |
| 2007/0223706 | A1 | 9/2007 | Gantman et al. |
| 2007/0265978 | A1 | 11/2007 | Kahn et al. |
| 2007/0276836 | A1 | 11/2007 | Chatterjee et al. |
| 2008/0082817 | A1 | 4/2008 | Takahashi et al. |
| 2008/0101596 | A1 | 5/2008 | Cerruti et al. |
| 2008/0137857 | A1 | 6/2008 | Bellare et al. |
| 2008/0144836 | A1 | 6/2008 | Sanders et al. |
| 2008/0263357 | A1* | 10/2008 | Boyen ................... H04L 9/083 713/168 |
| 2008/0285759 | A1 | 11/2008 | Shaw |
| 2008/0288773 | A1 | 11/2008 | Nguyen et al. |
| 2009/0048979 | A1 | 2/2009 | Al-Herz et al. |
| 2009/0161876 | A1 | 6/2009 | Sherkin |
| 2010/0005302 | A1 | 1/2010 | Vishnu et al. |
| 2010/0023771 | A1 | 1/2010 | Struik |
| 2010/0031369 | A1 | 2/2010 | Grummt |
| 2010/0054458 | A1 | 3/2010 | Schneider |
| 2010/0054480 | A1 | 3/2010 | Schneider |
| 2010/0131752 | A1 | 5/2010 | Flegel |
| 2010/0131755 | A1 | 5/2010 | Zhu et al. |
| 2010/0134848 | A1 | 6/2010 | Lynggaard et al. |
| 2010/0150341 | A1 | 6/2010 | Dodgson et al. |
| 2010/0172501 | A1 | 7/2010 | Tian et al. |
| 2010/0199095 | A1 | 8/2010 | Ho |
| 2010/0217986 | A1 | 8/2010 | Schneider |
| 2010/0228973 | A1 | 9/2010 | Dancer et al. |
| 2010/0241848 | A1 | 9/2010 | Smith et al. |
| 2011/0016510 | A1 | 1/2011 | Matsuda et al. |
| 2011/0022854 | A1 | 1/2011 | Macchetti et al. |
| 2011/0202773 | A1 | 8/2011 | Ghouti et al. |
| 2011/0246766 | A1 | 10/2011 | Orsini et al. |
| 2011/0307698 | A1 | 12/2011 | Vanstone |
| 2011/0311051 | A1 | 12/2011 | Resch et al. |
| 2012/0011362 | A1 | 1/2012 | Lambert |
| 2012/0039474 | A1 | 2/2012 | Ho |
| 2012/0100833 | A1 | 4/2012 | Gao |
| 2012/0214441 | A1 | 8/2012 | Raleigh |
| 2012/0233674 | A1 | 9/2012 | Gladstone et al. |
| 2012/0243687 | A1 | 9/2012 | Li et al. |
| 2012/0284794 | A1 | 11/2012 | Trent et al. |
| 2012/0290830 | A1 | 11/2012 | Resch et al. |
| 2012/0331287 | A1 | 12/2012 | Bowman et al. |
| 2013/0051552 | A1 | 2/2013 | Handschuh et al. |
| 2013/0061049 | A1 | 3/2013 | Irvine |
| 2013/0077783 | A1 | 3/2013 | Anshel et al. |
| 2013/0103945 | A1 | 4/2013 | Cannon et al. |
| 2013/0177157 | A1 | 7/2013 | Li et al. |
| 2013/0191632 | A1 | 7/2013 | Spector et al. |
| 2013/0287210 | A1* | 10/2013 | Matsuda ................. G06F 21/62 380/44 |
| 2013/0304642 | A1 | 11/2013 | Campos |
| 2013/0305057 | A1 | 11/2013 | Greco et al. |
| 2014/0012751 | A1 | 1/2014 | Kuhn et al. |
| 2014/0068246 | A1 | 3/2014 | Hartley et al. |
| 2014/0082358 | A1 | 3/2014 | Nakhjiri et al. |
| 2014/0129844 | A1 | 5/2014 | Johnson et al. |
| 2014/0223580 | A1 | 8/2014 | Neivanov et al. |
| 2014/0250006 | A1 | 9/2014 | Makhotin et al. |
| 2015/0039470 | A1 | 2/2015 | Crites |
| 2015/0052369 | A1 | 2/2015 | Koning et al. |
| 2015/0066748 | A1 | 3/2015 | Winslow et al. |
| 2015/0086020 | A1 | 3/2015 | Harjula et al. |
| 2015/0095648 | A1 | 4/2015 | Nix |
| 2015/0120567 | A1 | 4/2015 | Van Rooyen et al. |
| 2015/0154562 | A1 | 6/2015 | Emmerson |
| 2015/0188698 | A1 | 7/2015 | Tsai |
| 2015/0188700 | A1 | 7/2015 | Ben Saied et al. |
| 2015/0205929 | A1 | 7/2015 | Brama |
| 2015/0206106 | A1 | 7/2015 | Yago |
| 2015/0213433 | A1 | 7/2015 | Khan |
| 2015/0244690 | A1 | 8/2015 | Mossbarger |
| 2015/0254463 | A1 | 9/2015 | Ryhorchuk et al. |
| 2015/0256347 | A1 | 9/2015 | Tseng et al. |
| 2015/0262139 | A1 | 9/2015 | Shtylman |
| 2015/0262140 | A1 | 9/2015 | Armstrong |
| 2015/0269570 | A1 | 9/2015 | Phan et al. |
| 2015/0294425 | A1 | 10/2015 | Benson |
| 2015/0302401 | A1 | 10/2015 | Metral |
| 2015/0304302 | A1 | 10/2015 | Zhang |
| 2015/0310497 | A1 | 10/2015 | Valin et al. |
| 2015/0324764 | A1 | 11/2015 | Van Rooyen et al. |
| 2015/0324789 | A1 | 11/2015 | Dvorak et al. |
| 2015/0332224 | A1 | 11/2015 | Melika et al. |

(56) References Cited

U.S. PATENT DOCUMENTS

| | | |
|---|---|---|
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0027229 A1 | 1/2016 | Spanos et al. |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0046792 A1 | 2/2017 | Haldenby et al. |
| 2017/0075877 A1 | 3/2017 | Lepeltier |
| 2017/0083910 A1 | 3/2017 | Kraemer et al. |
| 2017/0091750 A1 | 3/2017 | Maim |
| 2017/0103385 A1 | 4/2017 | Wilson, Jr. et al. |
| 2017/0124348 A1 | 5/2017 | Pourzandi et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0146367 A1* | 5/2018 | Altin .................... H04L 9/0877 |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1* | 12/2018 | Wang .................... H04W 4/70 |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0285935 A1 | 9/2020 | Song et al. |
| 2021/0056070 A1 | 2/2021 | Kakavand et al. |
| 2021/0194677 A1 | 6/2021 | Pourzandi et al. |

FOREIGN PATENT DOCUMENTS

| | | |
|---|---|---|
| CN | 101447980 A | 6/2009 |
| CN | 102144371 A | 8/2011 |
| CN | 103440209 A | 12/2013 |
| CN | 103927656 A | 7/2014 |
| CN | 104320262 A | 1/2015 |
| CN | 105204802 A | 12/2015 |
| DE | 102010002241 B4 | 3/2012 |
| EP | 1477882 A2 | 11/2004 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |
| JP | 2008146601 A | 6/2008 |
| JP | 2009105824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2014068140 A | 4/2014 |
| JP | 2015536617 A | 12/2015 |
| JP | 5858506 B1 | 2/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2016022864 A2 | 2/2016 |

(56) References Cited

FOREIGN PATENT DOCUMENTS

| | | |
|---|---|---|
| WO | 2016137360 A2 | 9/2016 |
| WO | 2016161073 A1 | 10/2016 |
| WO | 2017112664 A1 | 6/2017 |

OTHER PUBLICATIONS

UK IPO Search Report dated Jul. 4, 2016, Patent Application No. GB1603125.4, filed Feb. 23, 2016, 6 pages.

UK IPO Search Report dated Jul. 5, 2016, Patent Application No. GB1603123.9, filed Feb. 23, 2016, 5 pages.

UK IPO Search Report dated Oct. 17, 2016, Patent Application No. GB1603117.1, filed Feb. 23, 2016, 5 pages.

UK IPO Search Report dated Oct. 26, 2016, Patent Application No. GB1603122.1, filed Feb. 23, 2016, 4 pages.

UK IPO Search Report dated Sep. 9, 2016, Patent Application No. GB1605571.7, filed Apr. 1, 2016, 5 pages.

Vayngrib, "DHT hardening," GitHub, https://github.com/tradle/about/wiki/DHT-hardening, Feb. 2, 2015 (last updated May 21, 2015) [retrieved Dec. 13, 2018], 5 pages.

Vayngrib, "Future, operating business on chain," Github.com, May 4, 2015 [retrieved Jan. 30, 2017], https://github.com/tradle/about/wiki/Future,-operating-business-on-chain, 9 pages.

Vietnamese Office Action dated Sep. 27, 2018, Patent Application No. 1-2018-03358, filed Feb. 16, 2017, 2 pages.

Walport et al., "Distributed Ledger Technology: beyond block chain—A report by the UK Government Chief Scientific Adviser," United Kingdom Government Office for Science, Dec. 2015, 88 pages.

Watanabe et al., "Blockchain contract: A complete consensus using blockchain," IEEE 4th Global Conference on Consumer Electronics, Oct. 27, 2015, 3 pages.

Weller et al., "CounterpartyXCP/Documentation: Protocol Specification," Github.com, Jan. 25, 2015 (last edited Jun. 17, 2019) [retrieved Jan. 13, 2020], 10 pages.

Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.

Wikipedia, "Counterparty (platform)," last edited Dec. 6, 2019 [retrieved Jan. 13, 2020], 2 pages.

Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.

Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.

Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.

Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Wright, "Registry and Automated Management Method for Blockchain Enforced Smart Contracts," U.S. Appl. No. 15/138,717, filed Apr. 26, 2016.

Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.

Yaokai et al., "Experimental evaluation of the next-generation cryptocurrency platform Ethereum," CSS2015 Computer Security Symposium 2015 Proceedings 2015(3):1151-1158, Oct. 14, 2015.

Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.

Zyskind et al., "Decentralizing Privacy: Using a Blockchain to Protect Personal Data," 2015 IEEE CS Security and Privacy Workshops, May 21, 2015, 5 pages.

Zyskind et al., "Enigma: Decentralized Computation Platform with Guaranteed Privacy," arXiv preprint arXiv:1506, Jun. 10, 2015, 14 pages.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.

Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.

Ryepdx et al., "Answer to What is the Global Registrar?," Ethereum Stack Exchange, Feb. 26, 2016 [retrieved Jan. 30, 2017], http://ethereum.stackexchange.com/questions/1610/what-is-the-global-registrar, 3 pages.

Sams, "Ethereum: Turing-complete, programmable money," Cryptonomics, Feb. 1, 2014, https://cryptonomics.org/2014/02/01/ethereum-turing-complete-programmable-money, 4 pages.

Sanchez, "Marketplaces," GitHub, Jun. 10, 2015 [retrieved May 12, 2020], https://github.com/drwasho/openbazaar-documentation/blob/master/04%20Marketplaces.md, 37 pages.

Sanchez, "Protocol," Github, https://github.com/drwasho/openbazaar-documentation/blob/master/03%20Protocol.md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.

Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.

Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.

Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.

Snow et al., "Factom: Business Processes Secured by Immutable Audit Trails on the Blockchain Version 1.2," factom.com, Apr. 25, 2018, 38 pages.

Stampery, "Features: Blockchain-based data certification at your fingertips," Stampery.com, https://stampery.com/features/, archived Mar. 5, 2016 [retrieved Nov. 3, 2016], 4 pages.

Sullivan et al., "Peer-to-peer Affine Commitment using Bitcoin," Carnegie Mellon University, Jun. 17, 2015, 54 pages.

Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.

Taiwanese Office Action dated Apr. 12, 2021, Patent Application No. 109142412, 5 pages.

Taiwanese Office Action dated Jul. 28, 2020, Patent Application No. 106105709, 9 pages.

Taiwanese Office Action dated Oct. 7, 2020, Patent Application No. 106105713, 4 pages.

Tasca et al., "Digital Currencies: Principles, Trends, Opportunities, and Risks," ECUREX Research Working Paper, Sep. 7, 2015 (Oct. 2015 version), 110 pages.

(56) References Cited

OTHER PUBLICATIONS

Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
TIMEISNOW77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB 1603125.4, filed Feb. 23, 2016, 11 pages.
UK Commercial Search Report dated Jun. 28, 2016, Patent Application No. GB 1603122.1, filed Feb. 23, 2016, 12 pages.
UK Commercial Search Report dated Jun. 6, 2016, Patent Application No. 1604497.6, filed Mar. 16, 2016, 6 pages.
UK Commercial Search Report dated Jun. 9, 2016, Patent Application No. GB1603117.1, filed Feb. 23, 2016, 12 pages.
UK Commercial Search Report dated May 20, 2016, Patent Application No. 1605026.2, 4 pages.
UK Commercial Search Report dated May 24, 2016, Patent Application No. GB1605571.7, filed Apr. 1, 2016, 3 pages.
UK Commercial Search Report dated May 9, 2016, Patent Application No. GB1603114.8, filed Feb. 23, 2016, 2 pages.
UK Commercial Search Report dated Nov. 14, 2016, Patent Application No. GB1607063.3, 8 pages.
UK Commercial Search Report dated Nov. 30, 2016, Patent Application No. 1607058.3, filed Apr. 22, 2016, 7 pages.
UK Commercial Search Report dated Sep. 30, 2016, Patent Application No. 1606630.0, filed Apr. 15, 2016, 7 pages.
UK Expanded Commercial Search Report dated Jun. 15, 2016, Patent Application No. 1605026.2, 5 pages.
UK IPO Search Report dated Dec. 12, 2016, Patent Application No. GB1606630.0, filed Apr. 15, 2016, 4 pages.
UK IPO Search Report dated Dec. 15, 2016, Patent Application No. GB1607063.3, 6 pages.
UK IPO Search Report dated Dec. 21, 2016, Patent Application No. GB1607058.3, filed Apr. 22, 2016, 3 pages.
UK IPO Search Report dated Dec. 28, 2016, Patent Application No. GB1604497.6, filed Mar. 16, 2016, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion dated Apr. 10, 2017, Patent Application No. PCT/IB2017/050861, 11 pages.
International Search Report and Written Opinion dated Apr. 12, 2017, Patent Application No. PCT/IB2017/050829, 9 pages.
International Search Report and Written Opinion dated Apr. 12, 2017, Patent Application No. PCT/IB2017/050866, 10 pages.
International Search Report and Written Opinion dated Apr. 26, 2017, International Patent Application No. PCT/IB2017/050865, filed Feb. 16, 2017, 9 pages.
International Search Report and Written Opinion dated Apr. 3, 2017, Patent Application No. PCT/IB2017/050824, filed Feb. 14, 2017, 13 pages.
International Search Report and Written Opinion dated Apr. 3, 2017, Patent Application No. PCT/IB2017/050827, 10 pages.
International Search Report and Written Opinion dated Mar. 29, 2017, Patent Application No. PCT/IB2017/050821, 10 pages.
International Search Report and Written Opinion dated Mar. 30, 2017, Patent Application No. PCT/IB2017/050825, 9 pages.
International Search Report and Written Opinion dated May 29, 2017, International Patent Application No. PCT/IB2017/050815, filed Feb. 14, 2017, 10 pages.
International Search Report and Written Opinion dated May 31, 2017, Patent Application No. PCT/IB2017/050856, filed Feb. 16, 2017, 11 pages.
International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
International Search Report and Written Opinion dated May 31, 2017, Patent Application No. PCT/IB2017/050980, 12 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Japanese Office Action dated Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.

(56) References Cited

OTHER PUBLICATIONS

Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat, "Handbook of Digital Currency Chapter 22: Blockchain Electronic Vote," Elsevier Inc., David Lee Kuo Chuen (ed.), May 2015, 9 pages.
Openchain, "Home Page," openchain.org, Dec. 22, 2015 [retrieved May 8, 2020], https://web.archive.org/web/20151222083734/https://www.openchain.org/, 18 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_RETURN data TxOut as standard transaction type. #2738," Github, Jun. 4, 2013, https://github.com/bitcoin/bitcoin/pull/2738, 12 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Antonopoulos, "Mastering Bitcoin—Unlocking Digital Cryptocurrencies," O'Reilly Media, Inc., Dec. 20, 2014, 282 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
bitcoininvestor.com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.
Bitfreak! et al., "Understanding Stealth Addresses/Payments," Bitcoin Forum, Jun. 10, 2015 (retrieved Jun. 16, 2020), https://bitcointalk.org/index.php?topic=1086498.0, 8 pages.
BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Block_Chan, "Tweet dated Nov. 7, 2018," Twitter, Nov. 7, 2018, https://twitter.com/block_chan/status/1060336404163584000, 1 page.
Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin, "Bitcoin Multisig Wallet: The Future Of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.

(56) References Cited

OTHER PUBLICATIONS

Corallo, "[Bitcoin-development] Relative CHECKLOCKTIMEVERIFY (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip.0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode,"New Kid on the Blockchain," Hacker News, https://news.ycombinator.com/item?id=11372455, Mar. 28, 2016 [Dec. 12, 2018], 32 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2I91/time_to_lobby_bitcoins_core_devs_sf_bitcoin_devs/, Mar. 14, 2015 [Dec. 12, 2018], 21 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Fotiou et al., "Decentralized Name-based Security for Content Distribution using Blockchains," retrieved from, Mobile Multimedia Laboratory, Department of Informatics, Apr. 14, 2016, 6 pages.
Fujimura et al., "BRIGHT: A Concept for a Decentralized Rights Management System Based on Blockchain," 2015 IEEE 5th International Conference on Consumer Electronics-Berlin (ICCE-Berlin), Sep. 6, 2015, 2 pages.
International Search Report and Written Opinion dated Mar. 30, 2017, Patent Application No. PCT/IB2017/050819, 13 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Michalko et al., "Decent Whitepaper," retrieved from http://forklog.net/decent-finalizes-its-decentralized-content-distribution-platform/, Nov. 2015, 20 pages.
Michalko, "DECENT Finalizes its Decentralized Content Distribution Platform," retrieved from http://forklog.net/decent-finalizes-its-decentralized-content-distribution-platform/, Dec. 14, 2016, 2 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Swan, "Blockchain: Blueprint for a New Economy," O'Reilly, Feb. 2015, 149 pages.
UK Commercial Search Report dated Jun. 27, 2016, Patent Application No. GB1603125.4, 11 pages.
UK Commercial Search Report dated May 16, 2016, Patent Application No. GB1603125.4, 8 pages.
UK Commercial Search Report dated Oct. 10, 2016, Patent Application No. GB1607484.1, filed Apr. 29, 2016, 5 pages.
UK IPO Search Report dated Jul. 4, 2016, Patent Application No. GB1603125.4, 6 pages.
White, "How Computers Work," Que Publishing 7th Edition, Oct. 15, 2003, 44 pages.

* cited by examiner

DETERMINING A COMMON SECRET FOR THE SECURE EXCHANGE OF INFORMATION AND HIERARCHICAL, DETERMINISTIC CRYPTOGRAPHIC KEYS

CROSS-REFERENCE TO RELATED APPLICATIONS

This application is a continuation of U.S. application Ser. No. 16/078,630 filed Aug. 21, 2018, entitled "DETERMINING A COMMON SECRET FOR THE SECURE EXCHANGE OF INFORMATION AND HIERARCHICAL, DETERMINISTIC CRYPTOGRAPHIC KEYS," a national stage entry based on PCT/IB2017/050856 filed Feb. 16, 2017, which claims priority to and incorporates by reference for all purposes the full disclosures of United Kingdom Application No. 1603117.1 filed Feb. 23, 2016, entitled "DETERMINING A COMMON SECRET FOR TWO BLOCKCHAIN NODES FOR THE SECURE EXCHANGE OF INFORMATION," and United Kingdom Application No. 1619301.3 filed Nov. 15, 2016, entitled "DETERMINING A COMMON SECRET FOR TWO BLOCKCHAIN NODES FOR THE SECURE EXCHANGE OF INFORMATION."

TECHNICAL FIELD

The present disclosure relates to determining a common secret for two nodes. In some applications, the common secret may be used for cryptography to enable secure communication between two nodes. The invention may be suited for use with, but not limited to, digital wallets, blockchain (e.g. Bitcoin) technologies and personal device security.

BACKGROUND

Cryptography involves techniques for secure communication between two or more nodes. A node may include a mobile communication device, a tablet computer, a laptop computer, desktop, other forms of computing devices and communication devices, a server device in a network, a client device in a network, one or more nodes in a distributed network, etc. The nodes may be associated with a natural person, a group of people such as employees of a company, a system such as a banking system, etc.

In some cases, the two or more nodes may be linked by a communications network that is unsecure. For example, the two nodes may be linked by a communications network where a third party may be able to eavesdrop on the communication between the nodes. Therefore, messages sent between nodes can be sent in encrypted form and where, upon receipt, the intended recipients may decrypt the messages with corresponding decryption key(s) (or other decryption methods). Thus the security of such communication may be dependent on preventing the third party from determining the corresponding decryption key.

One method of cryptography includes using symmetric-key algorithms. The keys are symmetric in the sense that the same symmetric-key is used for both encryption of a plain text message and decryption of cipher text. One consideration of using symmetric-key algorithms is how to transmit the symmetric-key to both nodes in a secure way to prevent an eavesdropper from acquiring the symmetric-key. This may include, for example, physically delivering the symmetric-key to the (authorised) nodes so that the symmetric-key is never transmitted over an unsecure communications network. However, physical delivery in not always an option. Therefore a problem in such cryptographic systems is the establishment of the symmetric-key (which may be based on a common secret) between the nodes across an unsecure network. In recent times, situations may make it desirable that transmission of keys is usually done electronically over communications systems such as the internet. Thus this step of providing a shared secret (e.g. the symmetric-key) is a potentially catastrophic vulnerability. As the symmetric-key algorithms (and protocols) are simple and widely used, there is a need for an ability for two nodes to determine a common secret key securely across an unsecure network.

Other existing cryptography methods include using asymmetric-keys. These may be used in public-key cryptography where they asymmetric-keys include a private key and a corresponding public key. The public key may be made publicly available whereas the private key, as the name implies, is kept private. These asymmetric-keys may be used for public-key encryption and for digital signature amongst other things. Existing protocols include as the Diffie-Hellman Key Exchange and the Three Pass Protocol enable the secure sharing of a secret across unsecure networks. However these methods are computationally expensive in some cases, such as where new secrets are to be continuously generated and shared.

Alternative asymmetric key hierarchies (such as described in the Bitcoin Developer's Guide) rely on a random seed and an index structure resulting in poor key management. In contrast, embodiments of the present invention may comprise the use of meaningful 'messages' (M) to not only generate asymmetric keys but also deterministic hierarchical shared secrets which are provably associated with specific data.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

According to an aspect of the present invention, there is provided a computer-implemented method of determining, at a first node (C), a common secret (CS) that is common with the first node (C) and a second node (S), wherein the first node (C) is associated with a first asymmetric cryptography pair having a first node master private key (V1C) and a first node master public key (P1C), and the second node (S) is associated with a second asymmetric cryptography pair having a second node master private key (V1S) and a second node master public key (P1S), wherein the method comprises:

determining a first node second private key ($V_{2C}$) based on at least the first node master private key ($V_{1C}$) and a deterministic key (DK);

determining a second node second public key ($P_{2S}$) based on at least the second node master public key ($P_{1S}$) and the deterministic key (DK); and determining the common secret (CS) based on the first node second private key ($V_{2C}$) and the second node second public key ($P_{2S}$),
wherein the second node (S) has the same common secret (CS) based on a first node second public key ($P_{2C}$) and a second node second private key ($V_{2S}$), wherein: the first node second public key ($P_{2C}$) is based on at least the first node master public key ($P_{1C}$) and the deterministic key (DK); and the second node second private key ($V_{2S}$) is based on at least the second node master private key ($V_{1S}$) and the deterministic key (DK).

This provides the advantage of enabling the second public keys to be derived independently at each node, thereby increasing security, while also enabling a machine to automate generation of sub-keys. The advantage is also provided of having matched transaction inputs that cannot be tracked, since the relationship between the public keys cannot be determined by third parties. This therefore enables a higher level of anonymity to be achieved, thereby improving security.

The deterministic key (DK) may be based on a message (M). The method may further comprise: generating a first signed message (SM1) based on the message (M) and the first node second private key (V2C); and sending, over the communications network, the first signed message (SM1) to the second node (S), wherein the first signed message (SM1) can be validated with a first node second public key (P2C) to authenticate the first node (C).

The method may also comprise: receiving, over the communications network, a second signed message (SM2) from the second node (S); validating the second signed message (SM2) with the second node second public key (P2S); and authenticating the second node (S) based on the result of validating the second signed message (SM2), wherein the second signed message (SM2) was generated based on the message (M), or a second message (M2), and the second node second private key (V2S).

The method may further comprise generating a message (M); and sending, over a communications network, the message (M) to the second node (S). Alternatively, the method may comprise receiving the message (M), over the communications network, from the second node (S). In yet another alternative, the method may comprise receiving the message (M), over the communications network, from another node. In yet another alternative, the method may comprise receiving the message (M) from a data store, and/or an input interface associated with the first node (C).

The first node master public key (P1C) and second node master public key (P1S) may be based on elliptic curve point multiplication of respective first node master private key (V1C) and second node master private key (V1S) and a generator (G).

The method may further comprise the steps of: receiving, over the communications network, the second node master public key (P1S); and storing, at a data store associated with the first node (C), the second node master public key (P1S).

The method may further comprise the steps of: generating, at a first node (C), the first node master private key (V1C) and the first node master public key (P1C); sending, over the communications network, the first node master public key (P1C) to the second node (S) and/or other node; and storing, in a first data store associated with the first node (C), the first node master private key (V1C).

The method may also comprise: sending, over the communications network, to the second node, a notice indicative of using a common elliptic curve cryptography (ECC) system with a common generator (G) for the method of determining a common secret (CS). The step of generating the first node master private key (V1C) and the first node master public key (P1C) may comprise: generating the first node master private key (V1C) based on a random integer in an allowable range specified in the common ECC system; and determining the first node master public key (P1C) based on elliptic curve point multiplication of the first node master private key (V1C) and the common generator (G) according to the following formula:

$$P_{1C}=V_{1C}\times G$$

The method may further comprise: determining the deterministic key (DK) based on determining a hash of the message (M), wherein the step of determining a first node second private key (V2C) is based on a scalar addition of the first node master private key (V1C) and the deterministic key (DK) according to the following formula:

$$V_{2C}=V_{1C}+DK$$

The step of determining a second node second public key (P2S) may be based on the second node master public key (P1S) with elliptic curve point addition to the elliptic curve point multiplication of the deterministic key (DK) and the common generator (G) according to the following formula:

$$P_{2S}=P_{1S}+DK\times G.$$

The deterministic key (DK) may be based on determining a hash of a previous deterministic key.

The first asymmetric cryptography pair and the second asymmetric cryptography pair may be based on a function of respective previous first asymmetric cryptography pair and previous second asymmetric cryptography pair.

According to another aspect of the present invention, there is provided a method of secure communication between a first node and a second node with symmetric-key algorithm, wherein the method comprises:
  determining a symmetric-key based on the common secret determined according to the method described above;
  encrypting a first communication message, with the symmetric-key, to an encrypted first communication message; and
  sending, over a communications network, the encrypted first communication message from the first node (C) to the second node (S).

The method may further comprise: receiving, over a communications network, an encrypted second communication message from the second node (S); and decrypting the encrypted second communication message, with the symmetric-key, to a second communication message.

According to a further aspect of the present invention, there is provided a method of performing an online transaction between a first node and a second node, wherein the method comprises: determining a symmetric-key based on the common secret determined according to the method according to the above described method; encrypting a first transaction message, with the symmetric-key, to an encrypted first transaction message; sending, over a communications network, the encrypted first transaction message from the first node (C) to the second node (S); receiving, over a communications network, an encrypted second transaction message from the second node (S); and decrypting the encrypted second transaction message, with the symmetric-key, to a second transaction message.

According to a further aspect of the present invention, there is provided a device for determining, at a first node (c), a common secret (CS) that is common with a second node (S), wherein the first node (C) is associated with a first asymmetric cryptography pair having a first node master private key (V1C) and a first node master public key (P1C), and the second node (S) is associated with a second asymmetric cryptography pair having a second node master private key (V1S) and a second node master public key (P1S), wherein the device comprises a first processing device to perform the method as defined above to determine the common secret.

According to a further aspect of the present invention, there is provided a device for secure communication, or performing a secure online transaction between a first node and a second node, wherein the device includes a first processing device to: perform the method of secure communication or secure online transaction described above.

The device may comprise a first data store to store one or more of the first node master private key (V1C). The first data store may also store one or more of the first node master public key (P1C), the second node master public key (P1S), and the message (M).

The device may further comprise a communications module to send and/or receive, over a communications network, one or more of the message (M), the first node master public key (P1C), the second node master public key (P1S), the first signed message (SM1), the second signed message (SM2), the notice indicative of using a common elliptic curve cryptography (ECC) system with a common generator (G).

According to a further aspect of the present invention, there is provided a system for determining a common secret between a first node (C) and a second node (S), wherein:

the first node (C) is associated with a first asymmetric cryptography pair having a first node master private key ($V_{1C}$) and a first node master public key ($P_{1C}$); and the second node (S) is associated with a second asymmetric cryptography pair having a second node master private key ($V_{1S}$) and a second node master public key ($P_{1S}$), and the system comprising:

a first processing device, associated with the first node (C), configured to:
determine a first node second private key ($V_{2C}$) based on at least the first node master private key ($V_{1C}$) and a deterministic key (DK);
determine a second node second public key ($P_{2S}$) based on at least the second node master public key ($P_{1S}$) and the deterministic key (DK); and
determine the common secret (CS) based on the first node second private key ($V_{2C}$) and the second node second public key ($P_{2S}$); and a second processing device, associated with the second node (S), configured to:
determine a first node second public key ($P_{2C}$) based on at least the first node master public key ($P_{1C}$) and the deterministic key (DK); and
determine a second node second private key ($V_{2S}$) based on at least the second node master private key ($V_{1S}$) and the deterministic key (DK); and
determine the common secret based on the first node second public key ($P_{2C}$) and a second node second private key ($V_{2S}$), wherein the first processing device and the second processing device determine the same common secret (CS).

In the system, the deterministic key (DK) is based on a message (M), and the first processing device is further configured to: generate a first signed message (SM1) based on the message (M) and the first node second private key (V2C); and send, over the communications network, the first signed message (SM1) to the second node (S). The second processing device may be further configured to: receive the first signed message (SM1); validate the first signed message (SM1) with the first node second public key (P2C); and authenticate the first node (C) based on a result of the validated first signed message (SM1).

In the system, the second processing device may be further configured to: generate a second signed message (SM2) based on the message (M), or a second message (M2), and the second node second private key (V2S); send the second signed message (SM2) to the first node (C), wherein the first processing device is further configured to: receive the second signed message (SM2); validate the second signed message (SM2) with the second node second public key (P2S); authenticate the second node (S) based on a result of the validated second signed message (SM2).

In the system, the first processing device may be further configured to: generate the message (M); and send the message (M), wherein the second processing device is configured to: receive the message (M). In one alternative, the message is generated by another node, wherein the first processing device is configured to: receive the message (M), and wherein the second processing device is configured to receive the message (M).

In yet another alternative, the system comprises a system data store and/or input interface, wherein the first processing device and second processing device receives the message (M), or the second message (M2) from the system data store and/or input interface.

The first processing device may receive the second node master public key (P1S) from the system data store and/or input device, and the second processing device may receive the first node master public key (P1C) from the system data store and/or input device.

The first node master public key (P1C), second node master public key (P1S) may be based on elliptic curve point multiplication of respective first node master private key (V1C) and second node master private key (V1S) and a generator (G).

The system may further comprise: a first data store associated with the first node (C) to store the first node master private key (V1C); and a second data store associated with the second node (S) to store the second node master private key (V1S).

In the system, the first processing device may be configured to: generate the first node master private key (V1C) and the first node master public key (P1C); send the first node master public key (P1C); and store the first node master private key (V1C) in the first data store, wherein the second processing device is configured to: generate the second node master private key (V1S) and the second node master public key (P1S); send the second node master public key (P1S); and store the second node master private key (V1S) in the second data store.

In the system, the first data store may receive and store the second node master public key (P1S); and the second data store may receive and store the first node master public key (P1C).

In the system, the first processing device may be further configured to: generate the first node master private key (V1C) based on a random integer in an allowable range specified in a common elliptic curve cryptography (ECC) system; and determine the first node master public key (P1C) based on elliptic curve point multiplication of the first node master private key (V1C) and a common generator (G) according to the formula:

$$P_{1C} = V_{1C} \times G$$

The second processing device may be further configured to: generate the second node master private key (V1S) based on a random integer in the allowable range specified in the common ECC system; and determine the second node master public key (P1S) based on elliptic curve point multiplication of the second node master private key (V1S) and the common generator (G) according to the formula:

$$P_{1S}=V_{1S} \times G.$$

In the system, the first processing device may be configured to: determine the deterministic key (DK) based on a hash of the message (M), and wherein: the first node second private key (V2C) is based on a scalar addition of the first node master private key (V1C) and the deterministic key (DK) according to the formula:

$$V_{2C}=V_{1C}+DK$$

and the second node second public key ($P_{2S}$) is based on the second node master public key ($P_{1S}$) with elliptic curve point addition to the elliptic curve point multiplication of the deterministic key (DK) and the common generator (G) according to the following formula:

$$P_{2S}=P_{1S}+DK \times G$$

The second processing device may be further configured to: determine the deterministic key (DK) based on a hash of the message (M), and wherein the second node second private key ($V_{2S}$) is based on a scalar addition of the second node master private key ($V_{1S}$) and the deterministic key (DK) according to the formula:

$$V_{2S}=V_{1C}+DK$$

and the first node second public key ($P_{2C}$) is based on the first node master public key ($P_{1C}$) with elliptic curve point addition to the elliptic curve point multiplication of the deterministic key (DK) and the common generator (G) according to the following formula:

$$P_{2C}=P_{1C}+DK \times G$$

The system may further comprise: a first communications module associated with the first processing device to send and/or receive, over a communications network, one or more of the message (M), the first node master public key (P1C), the second node master public key (P1S), the first signed message (SM1), the second signed message (SM2), and a notice indicative of using a common elliptic curve cryptography (ECC) system with a common generator (G); and a second communications module associated with the second processing device to send and/or receive, over a communications network, one or more of the message (M), the first node master public key (P1C), the second node master public key (P1S), the first signed message (SM1), the second signed message (SM2), and the notice indicative of using a common elliptic curve cryptography (ECC) system with a common generator (G).

In the system, the deterministic key (DK) may be based on determining a hash of a previous deterministic key.

In the system, the first asymmetric cryptography pair and the second asymmetric cryptography pair may be based on a function of respective previous first asymmetric cryptography pair and previous second asymmetric cryptography pair.

According to a further aspect of the present invention, there is provided a system for secure communication between a first node and a second node with symmetric-key algorithm, wherein the system comprises: a system described above to determine a common secret with the first processing device and the second processing device, wherein the first processing device is further configured to: determine a symmetric-key based on the common secret; encrypt a first communication message, with the symmetric-key, to an encrypted first communication message; and send the encrypted first communication message. The second processing device is further configured to: determine the same symmetric-key based on the common secret; receive the encrypted first communication message; and decrypt the encrypted first communication message, with the symmetric-key, to the first communication message.

In the system for secure communication, the second processing device may be further configured to: encrypt a second communication message, with the symmetric-key, to the encrypted second communication message; and send the encrypted second communication message. The first processing device may be further configured to: receive the encrypted second communication message; decrypt the encrypted second communication message, with the symmetric-key, to the second communication message.

In the above described system, the first and second communication messages may be transaction messages between the first node and second node for an online transaction between the first node and the second node.

According to a further aspect of the present invention, there is provided a computer program comprising machine-readable instructions to cause a processing device to implement any one of the method described above.

BRIEF DESCRIPTION OF DRAWINGS

Examples of the present disclosure will be described with reference to.

DESCRIPTION OF EMBODIMENTS

Overview

Figure 1:
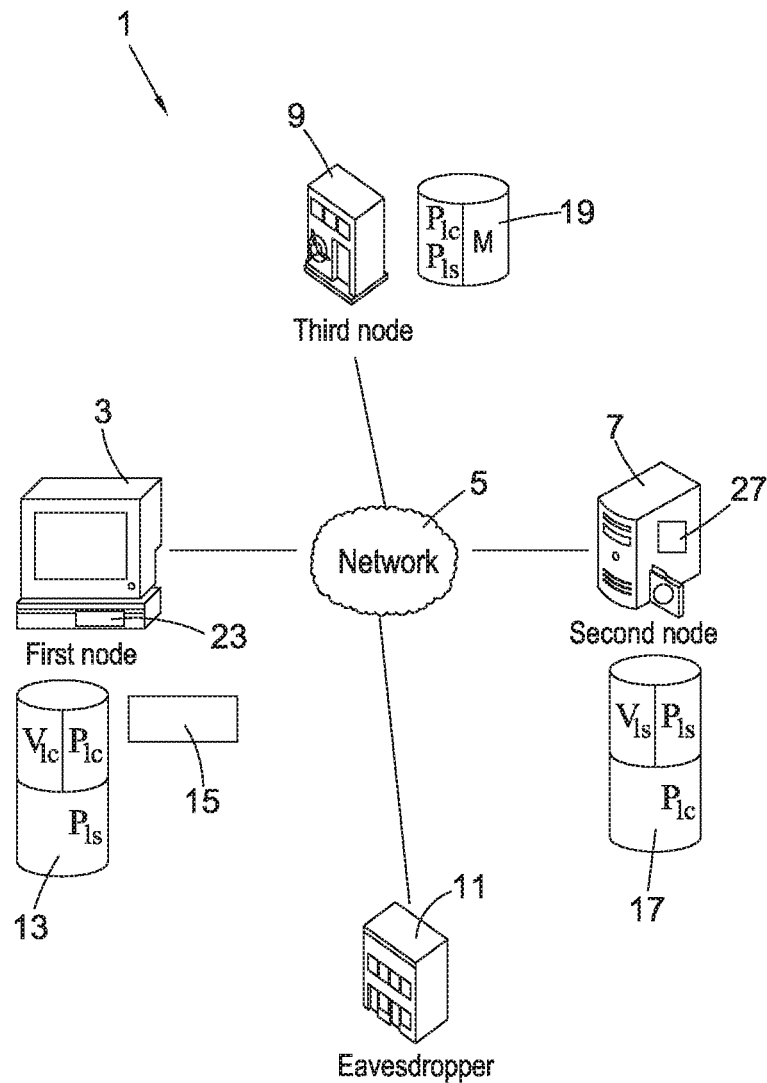
FIG. 1 is a schematic diagram of an example system to determine a common secret for a first node and second node.
Figure 2:
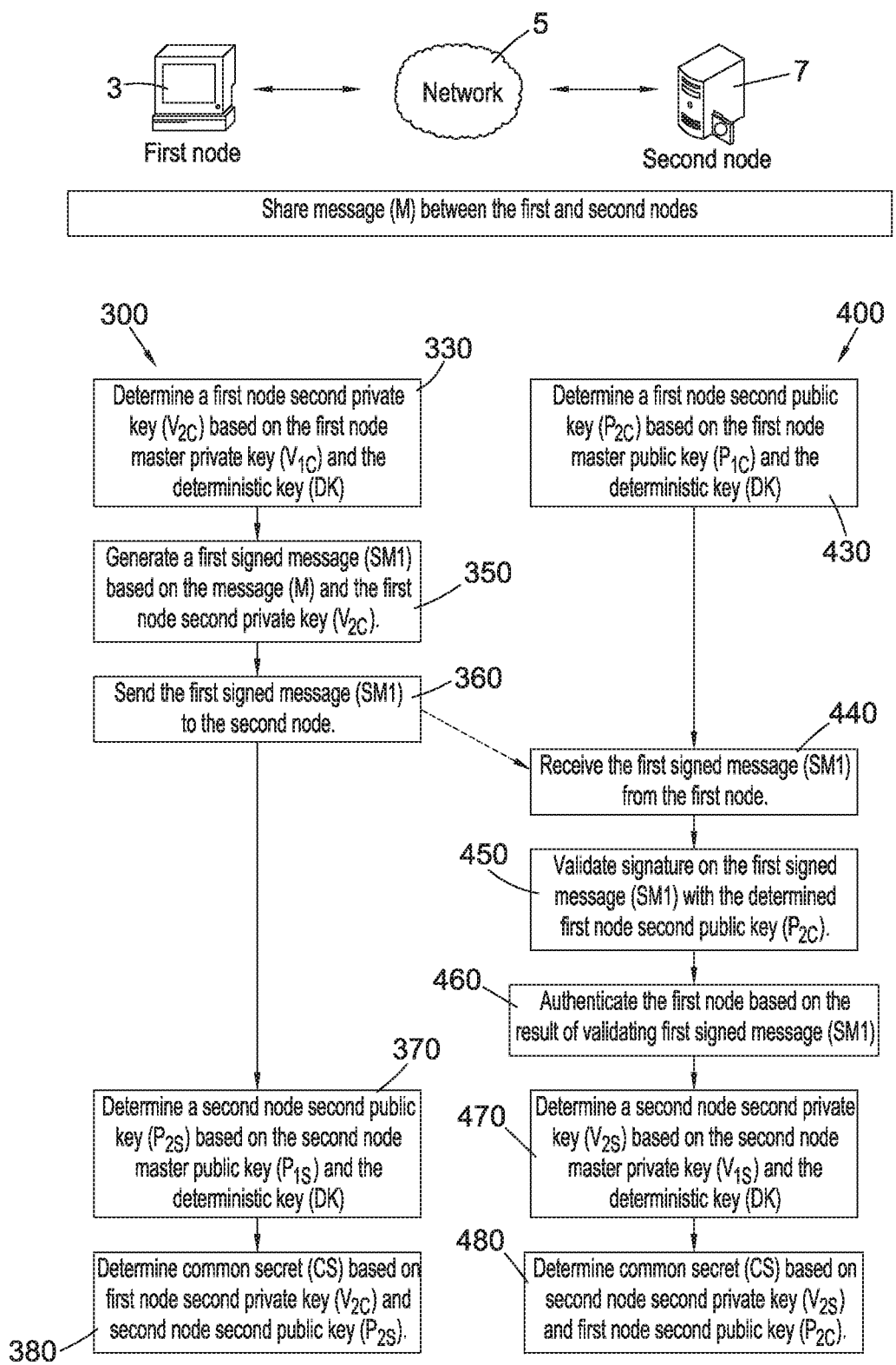
FIG. 2 is a flow chart of computer-implemented methods for determining a common secret.

A method, device and system to determine a common secret (CS) at a first node (C) that is the same common secret at a second node (S) will now be described. FIG. 1 illustrates a system 1 that includes a first node 3 that is in communication with, over a communications network 5, with a second node 7. The first node 3 has an associated first processing device 23 and the second node 5 has an associated second processing device 27. The first and second nodes 3, 7 may include an electronic device, such as a computer, tablet computer, mobile communication device, computer server etc. In one example, the first node 3 may be a client device and the second node 7 a server.

The first node 3 is associated with a first asymmetric cryptography pair having a first node master private key (V1C) and a first node master public key (P1C). The second node (7) is associated with a second asymmetric cryptography pair having a second node master private key (V1S) and a second node master public key (P1S). The first and second asymmetric cryptography pairs for the respective first and second nodes 3, 7 may be generated during registration. Methods of registration 100, 200 performed by the first and second nodes 3, 7 will be described in further detail below with reference to FIG. 3. The public key for each node may be shared publicly, such as over the communications network 5

To determine the common secret (CS) at both the first node 3 and second node 7, the nodes 3, 7 perform steps of respective methods 300, 400 without communicating private keys over the communications network 5.

The method 300 performed by the first node 3 includes determining 330 a first node second private key (V2C) based on at least the first node master private key (V1C) and a deterministic key (DK). The deterministic key may be based on a message (M) that is a shared between the first and second nodes, which may include sharing the message over the communications network 5 as described in further detail below. The method 300 also includes determining 370 a second node second public key (P2S) based on at least the second node master public key (P1S) and the deterministic key (DK). The method 300 includes determining 380 the common secret (CS) based on the first node second private key (V2C) and the second node second public key (P2S).

Importantly, the same common secret (CS) can also be determined at the second node 7 by method 400. The method 400 determining 430 a first node second public key (P2C) based on the first node master public key (P1C) and the deterministic key (DK). The method 400 further include determining 470 a second node second private key (V2S) based on the second node master private key (V1S) and the deterministic key (DK). The method 400 includes determining 480 the common secret (CS) based on the second node second private key (V2S) and the first node second public key (P2C).

The communications network 5, may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5. Thus one advantage is that the common secret (CS) may be determined securely by each node without having to transmit a private key over a potentially unsecure communications network 5. In turn, the common secret may be used as a secret key (or as the basis of a secret key) for encrypted communication between the first and second nodes 3, 7 over the communications network 5.

The methods 300, 400 may include additional steps. The method 300 may include, at the first node 3, generating a signed message (SM1) based on the message (M) and the first node second private key (V2C). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM1) with the first node second public key (P2C) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key (V1C) and therefore only the first node 3 can determine the first node second private key (V2C) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In yet another example, the message may be generated at a third node 9 and the message sent to both the first and second nodes 3, 7. In yet another alternative, a user may enter the message through a user interface 15 to be received by the first and second nodes 3, 7. In yet another example, the message (M) may be retrieved from a data store 19 and sent to the first and second nodes 3, 7. In some examples, the message (M) may be public and therefore may be transmitted over an unsecure network 5.

In further examples, one or more messages (M) may be stored in a data store 13, 17, 19, where the message may be associated with a session, transaction, etc, between the first node 3 and the second node 7. Thus the messages (M) may be retrieved and used to recreate, at the respective first and second nodes 3, 7, the common secret (CS) associated with that session, or transaction. Advantageously, a record to allow recreation of the common secret (CS) may be kept without the record by itself having to be stored privately or transmitted securely. This may be advantageous if numerous transactions are performed at the first and second nodes 3, 7 and it would be impractical to store all the messages (M) at the nodes themselves.

Method of Registration 100, 200

Figure 3:
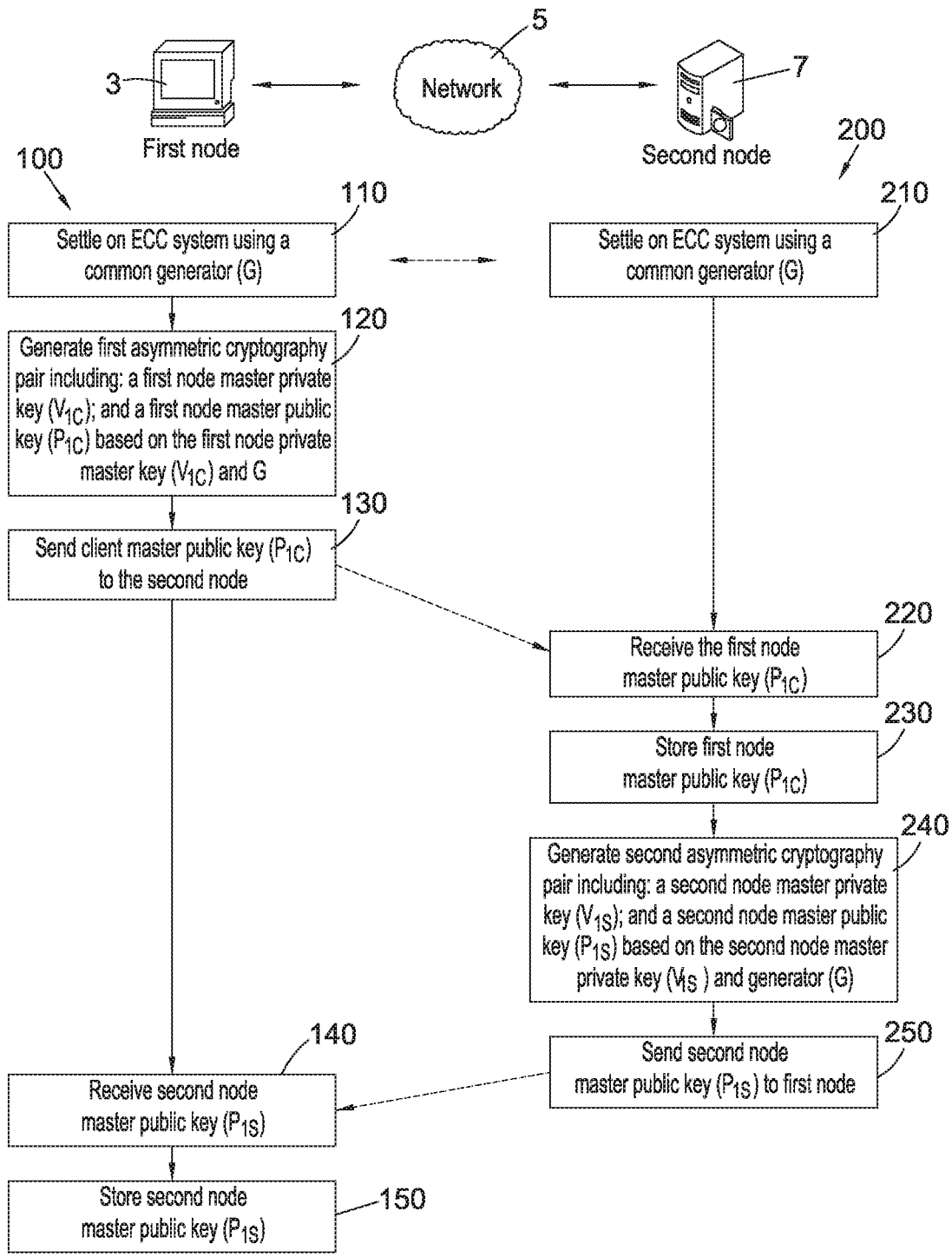
FIG. 3 is a flow chart of computer-implemented methods to register the first and second nodes.

An example of a method of registration 100, 200 will be described with reference to FIG. 3, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 100, 200, this includes the first and second nodes settling 110, 210 to a common ECC system and using a common generator (G). In one example, the common ECC system may be based on secp256K1 which is an ECC system used by Bitcoin. The common generator (G) may be selected, randomly generated, or assigned.

Turning now to the first node 3, the method 100 includes settling 110 on the common ECC system and common generator (G). This may include receiving the common ECC system and common generator from the second node 7, or a third node 9. Alternatively, a user interface 15 may be associated with the first node 3, whereby a user may selectively provide the common ECC system and/or common generator (G). In yet another alternative one or both of the common ECC system and/or common generator (G) may be randomly selected by the first node 3. The first node 3 may send, over the communications network 5, a notice indicative of using the common ECC system with a common generator (G) to the second node 7. In turn, the second node 7 may settle 210 by sending a notice indicative of an acknowledgment to using the common ECC system and common generator (G).

The method 100 also includes the first node 3 generating 120 a first asymmetric cryptography pair that includes the first node master private key (V1C) and the first node master public key (P1C). This includes generating the first node master private key (V1C) based, at least in part, on a random integer in an allowable range specified in the common ECC system. This also includes determining the first node master public key (P1C) based on elliptic curve point multiplication of the first node master private key (V1C) and the common generator (G) according to the formula:

$$P_{1C} = V_{1C} \times G \quad \text{(Equation 1)}$$

Thus the first asymmetric cryptography pair includes:
$V_{1C}$: The first node master private key that is kept secret by the first node.
$P_{1C}$: The first node master public key that is made publicly known.

The first node 3 may store the first node master private key (V1C) and the first node master public key (P1C) in a first data store 13 associated with the first node 3. For security, the first node master private key (V1C) may be stored in a secure portion of the first data store 13 to ensure the key remains private.

The method 100 further includes sending 130 the first node master public key (P1C), over the communications network 5, to the second node 7. The second node 7 may, on receiving 220 the first node master public key (P1C), store 230 the first node master public key (P1C) in a second data store 17 associated with the second node 7.

Similar to the first node 3, the method 200 of the second node 7 includes generating 240 a second asymmetric cryptography pair that includes the second node master private key (V1S) and the second node master public key (P1S). The second node master private key (V1S) is also a random integer within the allowable range. In turn, the second node master public key (P1S) is determined by the following formula:

$$P_{1S} = V_{1S} \times G \quad \text{(Equation 2)}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key (P1S) to the first node 3. In turn, the first node 3 may receive 140 and stores 150 the second node master public key (P1S).

It is to be appreciated that in some alternatives, the respective public master keys may be received and stored at a third data store 19 associate with the third node 9 (such as a trusted third party). This may include a third party that acts as a public directory, such as a certification authority. Thus in some examples, the first node master public key (P1C) may requested and received by the second node 7 only when determining the common secret (CS) is required (and vice versa).

The registration steps may only need to occur once as an initial setup. Afterwards, the master keys can be reused in a secure matter to generate common secret(s) that are dependent, inter alia, on the deterministic key (DK).

Session Initiation and Determining the Common Secret by the First Node 3

Figure 4:
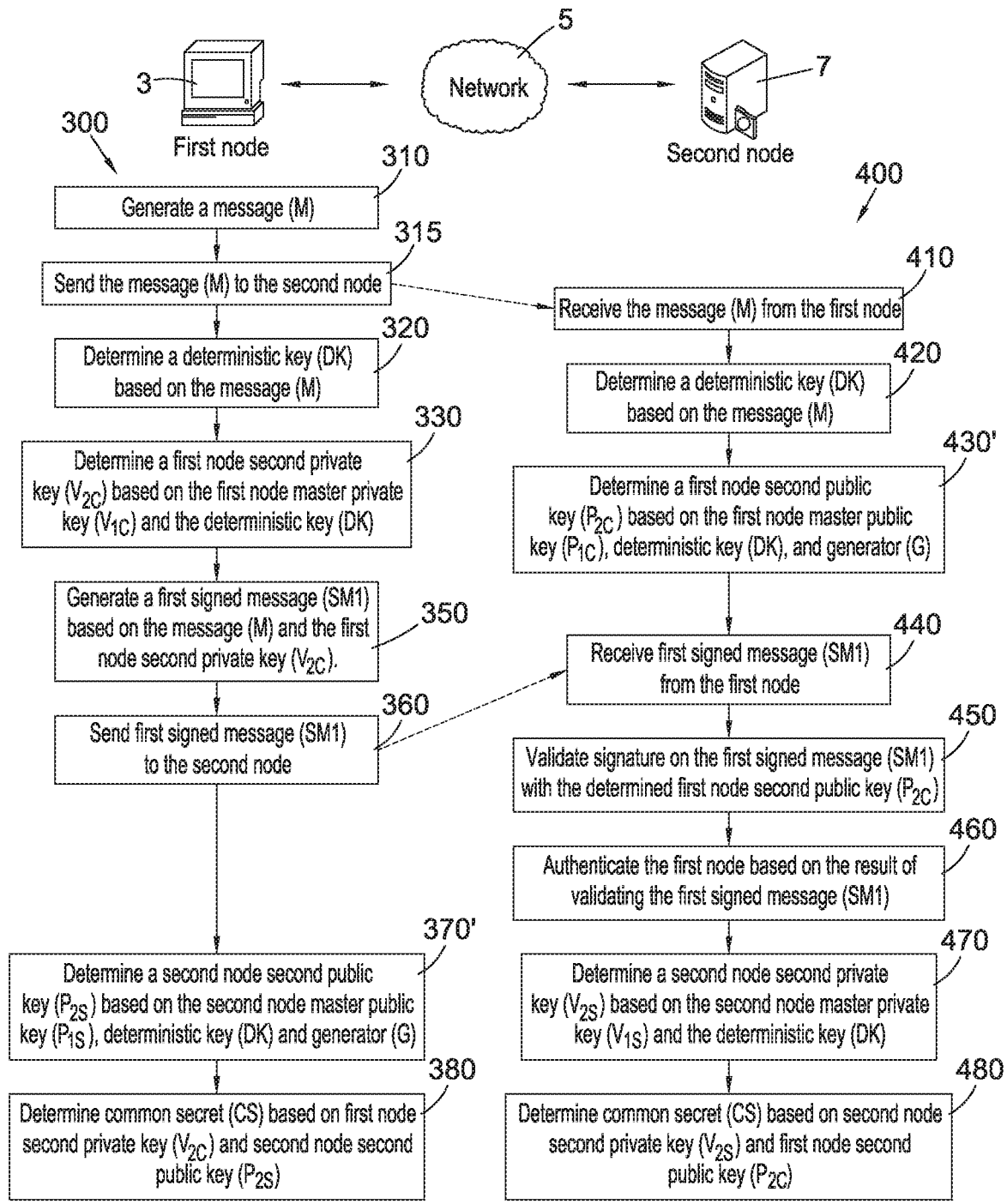
FIG. 4 is another flow chart of computer-implemented methods for determining a common secret.

An example of determining a common secret (CS) will now be described with reference to FIG. 4. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message } (M) = \text{UnixTime} + \text{nonce} \quad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Deterministic Key 320

The method 300 further includes the step of determining 320 a deterministic key (DK) based on the message (M). In this example, this includes determining a cryptographic hash of the message. An example of a cryptographic hash algorithm includes SHA-256 to create a 256-bit deterministic key (DK). That is:

$$DK = SHA\text{-}256(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key (V2C) based on the second node master private key (V1C) and the deterministic key (DK). This can be based on a scalar addition of the first node master private key (V1C) and the deterministic key (DK) according to the following formula:

$$V_{2C} = V_{1C} + DK \quad \text{(Equation 5)}$$

Thus the first node second private key (V2C) is not a random value but is instead deterministically derived from the first node master private key. The corresponding public key in the cryptographic pair, namely the first node second public key (P2C), has the following relationship:

$$P_{2C} = V_{2C} \times G \quad \text{(Equation 6)}$$

Substitution of V2C from Equation 5 into Equation 6 provides:

$$P_{2C} = (V_{1C} + DK) \times G \quad \text{(Equation 7)}$$

Where the '+' operator refers to scalar addition and the 'x' operator refers to elliptic curve point multiplication. Noting that elliptic curve cryptography algebra is distributive, Equation 7 may be expressed as:

$$P_{2C} = V_{1C} \times G + DK \times G \quad \text{(Equation 8)}$$

Finally, Equation 1 may be substituted into Equation 7 to provide:

$$P_{2C} = P_{1C} + DK \times G \quad \text{(Equation 9.1)}$$

$$P_{2C} = P_{1C} + SHA\text{-}256(M) \times G \quad \text{(Equation 9.2)}$$

In equations 8 to 9.2, the '+' operator refers to elliptic curve point addition. Thus the corresponding first node second public key (P2C) can be derivable given knowledge of the first node master public key (P1C) and the message (M). The second node 7 may have such knowledge to independently determine the first node second public key (P2C) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key (V2C). Generating a signed message includes applying a digital signature algorithm to digitally sign the message (M). In one example, this includes applying the first node second private key (V2C) to the message in an Elliptic Curve Digital Signature Algorithm (ECDSA) to obtain the first signed message (SM1).

Examples of ECDSA include those based on ECC systems with secp256k1, secp256r1, secp384r1, se3cp521r1.

The first signed message (SM1) can be verified with the corresponding first node second public key (P2C) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key (P2S). As discussed above, the second node second public key (P2S) may be based at least on the second node master public key (P1S) and the deterministic key (DK). In this example, since the public key is determined 370' as the private key with elliptic curve point multiplication with the generator (G), the second node second public key (P2S) can be expressed, in a fashion similar to Equation 6, as:

$$P_{2S} = V_{2S} \times G \quad \text{(Equation 10.1)}$$

$$P_{2S} = P_{1S} + DK \times G \quad \text{(Equation 10.2)}$$

The mathematical proof for Equation 10.2 is the same as described above for deriving Equation 9.1 for the first node second public key (P2C). It is to be appreciated that the first node 3 can determine 370 the second node second public key independently of the second node 7.

Determine the Common Secret 380 at the First Node 3

The first node 3 may then determine 380 the common secret (CS) based on the determined first node second private key (V2C) and the determined second node second public key (P2S). The common secret (CS) may be determined by the first node 3 by the following formula:

$$S = V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a deterministic key (DK) based on the message (M). The step of determining 420 the deterministic key (DK) by the second node 7 is similar to the step 320 performed by the first node described above. In this example, the second node 7 performs this determining step 420 independent of the first node 3.

The next step includes determining 430 a first node second public key (P2C) based on the first node master public key (P1C) and the deterministic key (DK). In this example, since the public key is determined 430' as the private key with elliptic curve point multiplication with the generator (G), the first node second public key (P2C) can be expressed, in a fashion similar to Equation 9, as:

$$P_{2C} = V_{2C} \times G \quad \text{(Equation 12.1)}$$

$$P_{2C} = P_{1C} + DK \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key (P2C) that was determined at step 430.

Verifying the digital signature may be done in accordance with an Elliptic Curve Digital Signature Algorithm (ECDSA) as discussed above. Importantly, the first signed message (SM1) that was signed with the first node second private key (V2C) should only be correctly verified with the corresponding first node second public key (P2C), since V2C and P2C form a cryptographic pair. Since these keys are deterministic on the first node master private key (V1C) and the first node master public key (P1C) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The above authentication may be suitable for scenarios where one of the two nodes are a trusted node and only one of the nodes need to be authenticated. For example, the first node 3 may be a client and the second node 7 may be a server trusted by the client. Thus the server (second node 7) may need to authenticate the credentials of the client (first node 3) in order to allow the client access to the server system. It may not be necessary for the server to be authenticate the credentials of the server to the client. However in some scenarios, it may be desirable for both nodes to be authenticated to each other, such as in a peer-to-peer scenario that will be described in another example below.

The Second Node 7 Determining the Common Secret

The method 400 may further include the second node 7 determining 470 a second node second private key (V2S) based on the second node master private key (V1S) and the deterministic key (DK). Similar to step 330 performed by the first node 3, the second node second private key (V2S) can be based on a scalar addition of the second node master private key (V1S) and the deterministic key (DK) according to the following formulas:

$$V_{2S} = V_{1S} + DK \quad \text{(Equation 13.1)}$$

$$V_{2S} = V_{1S} + SHA\text{-}256(M) \quad \text{(Equation 13.2)}$$

The second node 7 may then, independent of the first node 3, determine 480 the common secret (CS) based on the second node second private key (V2S) and the first node second public key (P2C) based on the following formula:

$$S = V_{2S} \times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may be used as a secret key, or as the basis of a secret key in a symmetric-key algorithm for secure communication between the first node 3 and second node 7.

The common secret (CS) may be in the form of an elliptic curve point (xS, yS). This may be converted into a standard key format using standard publicly known operations agreed by the nodes 3, 7. For example, the xS value may be a 256-bit integer that could be used as a key for AES256 encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some applications, the common secret (CS) could be stored in the first data store (X) associated with the first node provided the common secret (CS) is kept as secure as the first node master private key (V1C).

Furthermore, the disclosed system may allow determination of multiple common secrets that may correspond to multiple secure secret keys based on a single master key cryptography pair. An advantage of this may be illustrated by the following example.

In situations where there are multiple sessions, each associated with multiple respective common secrets (CS), it may be desirable to have a record associated with those multiple sessions so that the respective common secrets (CS) can be re-determined for the future. In known systems, this may have required multiple secret keys to be stored in a secure data store, which may be expensive or inconvenient to maintain. In contrast, the present system has the master private keys kept secure at the respective first and second nodes, whilst the other deterministic keys, or message (M), may be stored either securely or insecurely. Despite the deterministic keys (DK, or message (M), being stored insecurely, the multiple common secrets (CS) are kept secure since the master private keys required to determine the common secrets are still secure.

The method may also be used for generating "session keys" for temporary communication links, such as for securely transmitting login passwords.

Example Applications

The methods, device, and system of the present disclosure may have a number of applications including but not limited to those described below.

Message Encryption

The present disclosure may be used to facilitate secure communication, in particular sending and receiving communication messages, between the first node 3 and second node 7 over a potentially unsecure communications network 5. This may be achieved by using the common secret (CS) as the basis for a symmetric-key. This method of determining a common secret (CS) and using the symmetric-key for encryption and decryption of the communication messages may be more computationally efficient compared to known public-key encryption methods.

Figure 5:
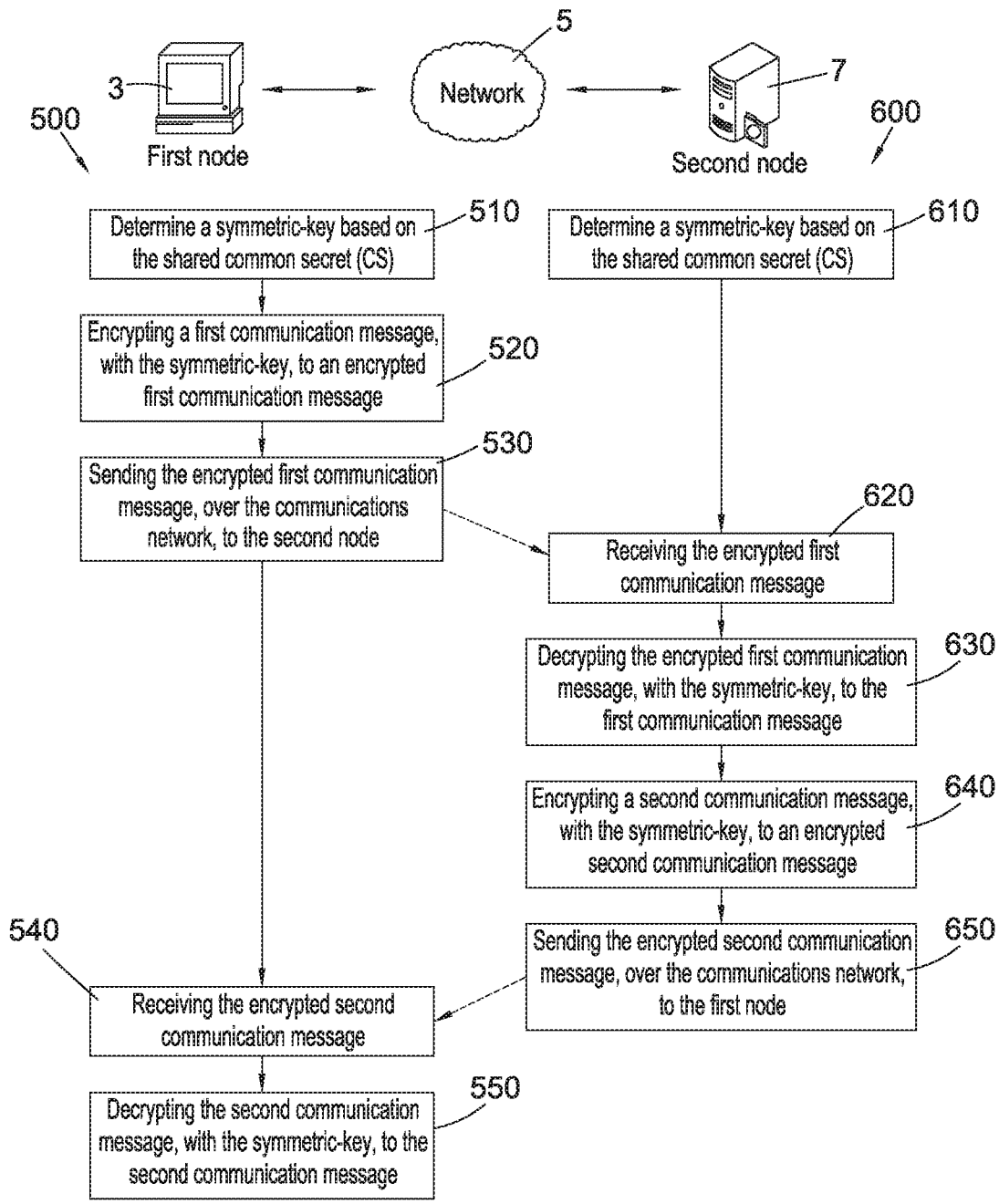
FIG. 5 is a flow chart of computer-implemented methods of secure communication between the first node and second node.

Methods 500, 600 of secure communication between the first node 3 and second node 7 will now be described with reference to FIG. 5. The first node 3 determines 510 a symmetric-key based on the common secret (CS) determined in the method above. This may include converting the common secret (CS) to a standard key format. Similarly, the second node 7 can also determine 610 the symmetric-key based on the common secret (CS).

To send a first communication message securely from the first node 3, over the communications network, to the second node, the first communication message needs to be encrypted. Thus the symmetric-key is used by the first node for encrypting 520 a first communication message to form an encrypted first communication message, which is then sent 530, over the communications network 5, to the second node 7. The second node 7, in turn, receives 620 the encrypted first communication message 620, and decrypts 630 the encrypted first communication message, with the symmetric-key, to the first communication message.

Similarly, the second node 7 may encrypt 640 a second communication message, with the symmetric-key, to an encrypted second communication message, which is then sent 650 to the first node 3. The first node 3 may then receive 540 the encrypted second communication message, and decrypt 550 it to the second communication message.

Cryptocurrency Wallet

In another example, the method may be used for generation and management of common secrets (CS) such as secret keys for cryptocurrency transactions. Cryptocurrency keys, such as those used in Bitcoin transactions, are normally associated with funds and assets that can be exchanged for value.

Electronic Resource Rental

Figure 6:
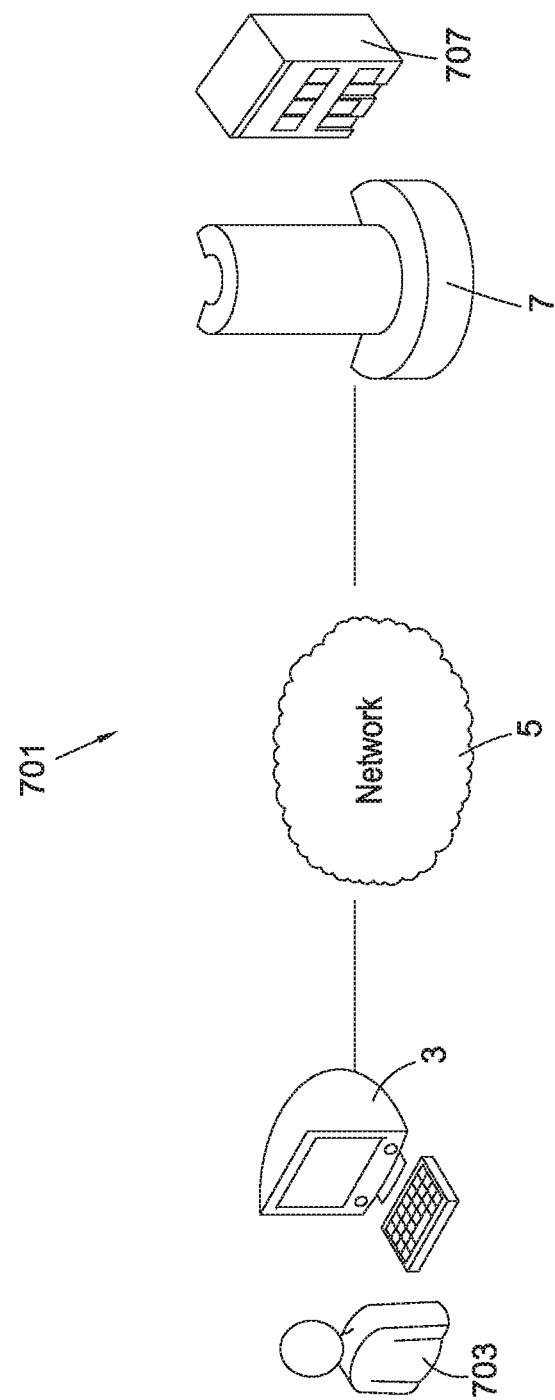
FIG. 6 is a schematic diagram of an example system for electronic resource rental.

An example of using the method and system for facilitating electronic resource rental will be described with reference to FIG. 6. This illustrates a system 701 where the first node 3 is associated with a client 703 and the second node 7 is associated with an electronic resource, such with a supercomputer facility 707. Thus the client 504 may want to use the remotely located supercomputer facility 707 for processing large amounts of confidential data.

The supercomputer facility 707 may rent out the supercomputer CPU time on a per time and/or per CPU cycle basis. The client 703 may register with the supercomputer facility by depositing their public key, such as by sending 130, over a communications network 5, the first node master public key (P1C) to the second node 7.

The supercomputer facility 707 may then provide software to the client 703 for performing background processes such as establishing secure connections using AES encryption and for facilitating the steps in the method 300 described above.

When performing the method 300, the first node 3 may send 360 a first signed message (SM1) which, in part, is based on a message (M) that includes the Unix Time concatenated with a nonce.

The second node 7, may receive 440 the first signed message (SM1). The second node 7 may further perform a step of determining if the Unix Time in the message (M) is within an allowed value for the Unix Time. For example, the allowed value for the Unix Time may be set according to Terms and Conditions settled between the client 703 and the supercomputer facility 707. For example, the Unix Time (of the message) may be required to be within a set period (e.g. 300 seconds) of when the supercomputer facility receives 440 the first signed message (SM1). If the Unix Time in the message (M) is outside the allowed time, the exchange of confidential data will not be accepted.

The above steps may ensure that the resultant session key, that is based on the determined common secret (CS) at steps 380, 480, can never be reproduced at a later time and is unique to the session being established. A protocol may then be used to establish a symmetric session key, such as an AES encryption/decryption key, for the duration of the session. The session key is used for all communications between the first node 3 and the second node 7 for the duration of the session. This allows the client to encrypt code and/or large amounts of data, send these to the supercomputer facility 707 for processing, and receive encrypted results back from the supercomputer facility 707.

Password Replacement, Supplement or Alternative

Figure 7:
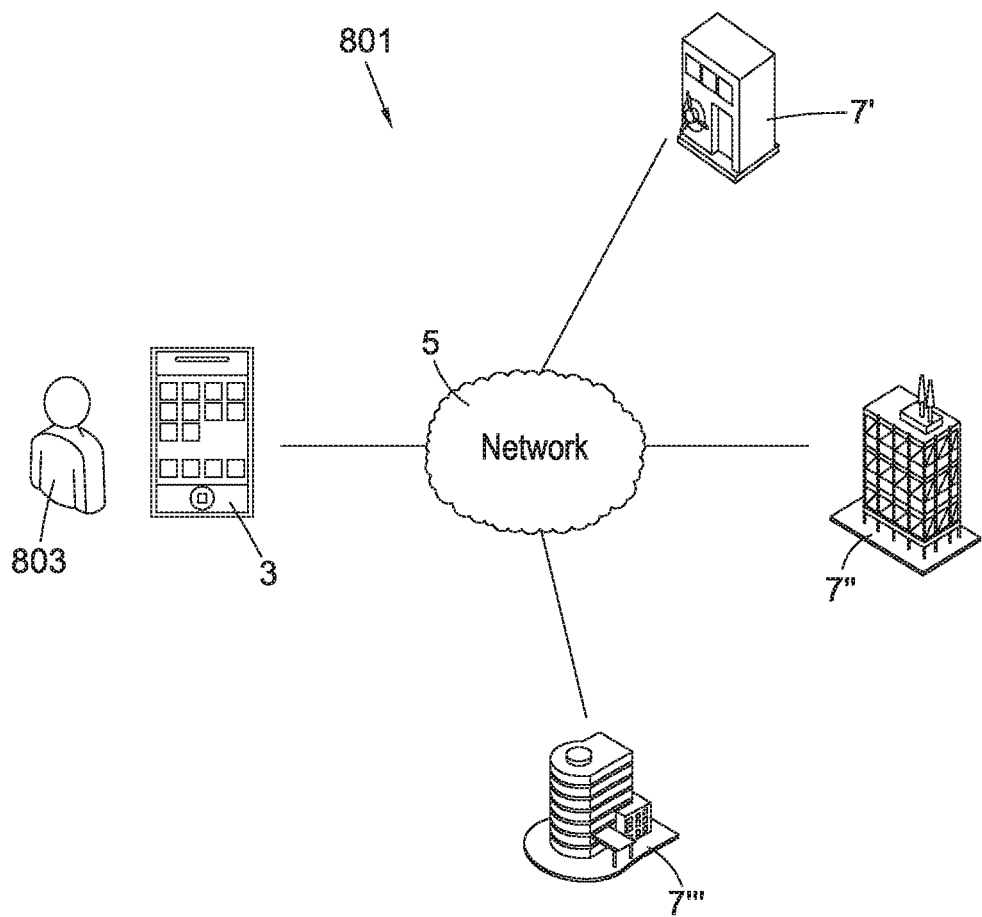
FIG. 7 is a schematic diagram of an example system that applies the methods to password replacement.

The system and method may also be used as a password replacement, supplement, or alternative. Referring to FIG. 7 there is provided a system that includes a first node 3 associated with a user and a plurality of additional nodes 7', 7", 7'". The plurality of additional nodes may each be associated with respective institutions participating in the same protocol. For example, the institutions may include banks, service providers, government services, insurance companies, telecommunication providers, retailers, etc.

The user 803 may wish to communicate with these institutions, in a secure manner, to access services. In known systems, this may require the user to have multiple passwords to login for each of the respective institutions. Using the same password for login for multiple institutions is not desirable for security reasons.

In this example, the user and the multiple institutions settle on using the same protocol. This may include settling on the ECC system (such as those based on secp256k1, secp256r1, secp384r1, secp521r1) and a generator (G). The user may then register and share the first node master public key (P1C) with the plurality of institutions and associated additional nodes 7', 7", 7'". The additional nodes 7', 7", 7'" may each perform steps of the method similar to the second node 7 as described above.

Each time the user 803 wishes to log into one of the websites of a participating institution they do not need to use a password. Instead, the protocol replaces the need for passwords for each institution. All that is required at the first node 3 is the Institution's Public Key, which is always available, and registration of the user at the institutions (including registering the first node master public key (P1C) with the institution). Since registration by the user with an institution is a normal practice for using web-based services, this is not a burden on the user 803. Once the registration has been completed, a common secret (CS) can be determined, used and re-used in place of a password. For example at the start of every session, the first node 3 may generate 310 a message (M) that is sent to the additional node 7', 7", 7'" involved in the session. The message (M) is used to determine 320, 420 a corresponding deterministic key which is then used by both the first node 3 and additional node 7', 7", 7'" to determine the common secret (CS) as described in the methods above. Alternatively, the message (M) may be generated or received from the additional node 7', 7", 7'". In yet another alternative, the message (M) may be a predetermined message stored in a data store 13, 17, 19 accessible by the first node 3 and/or additional node 7', 7", 7'".

This technique lifts a significant security burden from the institutions. In particular, they no longer need to keep a password file (secret record of passwords or password hashes) as the common secret can be recalculated from non-secret information. Rather, the institution need only keep their own master private key secure. Furthermore, the user does not need to memorise or securely store many passwords (one for each institution) so long as they can keep their first node master private key (V1C) secure.

Variations

Some variations will now be described with the following examples.

Peer-to Peer Authentication

Figure 8:
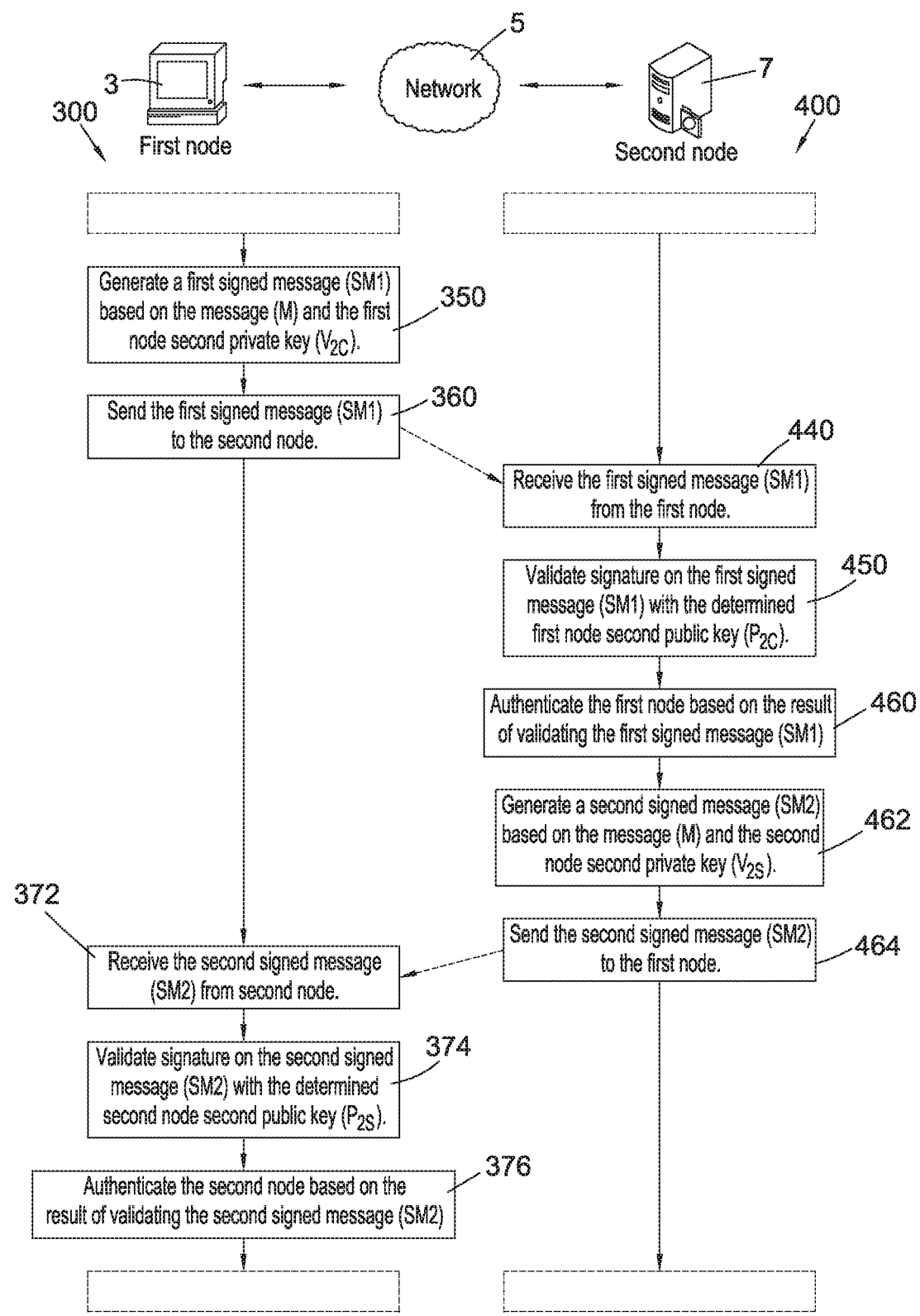
FIG. 8 is a flow chart of computer implemented methods to authenticate the first node and the second node.

In a peer-to-peer scenario, the first node 3 and the second node 7 may need to authenticate the credentials of one another. An example of this will now be described with reference to FIG. 8. In this example, the method 300, 400 steps to authenticate the first node 3 based on the validated first signed message (SM1) are similar to those discussed above.

However, the method 400 performed by the second node 7 further includes generating 462 a second signed message (SM2) based on the message (M) and the second node private key (V2S). In some alternatives, the second signed message (SM2) may be based on a second message (M2) and the second node private key (V2S), where the second message (M2) is shared with the first node 3. The method 400 further includes sending 464 the second signed message (SM2), over the communications network 5, to the first node 3.

At the first node 3, the method 300 includes receiving the second signed message (SM2) from the second node 7. The method includes validating 374 the signature on the second signed message (SM2) with the second node second public key (P2S) that was determined at step 370. The method 300 may then include authenticating 376 the second node 7 based on the result of validating the second signed message (SM2). This results in the first and second nodes 3, 7 authenticating one another.

Hierarchy of Deterministic Keys

In one example, a series of successive deterministic keys may be determined, where each successive key may be determined based on the preceding deterministic key.

For example, instead of repeating steps 310 to 370 and 410 to 470 to generate successive single-purpose keys, by prior agreement between the nodes, the previously used deterministic key (DK) can be rehashed repeatedly by both parties to establish a hierarchy of deterministic keys. In effect, the deterministic key, based on the hash of a message (M), can be a next generation message (M') for the next generation of deterministic key (DK'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the deterministic key (DK'). This is similar to steps 320 and 420 but adapted with the following formulas:

$$M'=SHA\text{-}256(M) \quad \text{(Equation 18)}$$

$$DK'=SHA\text{-}256(M') \quad \text{(Equation 19.1)}$$

$$DK'=SHA\text{-}256(SHA\text{-}256(M)) \quad \text{(Equation 19.2)}$$

The first node 3 may then determine the next generation of the second node second public key (P2S') and the first node second private key (V2C') similar to steps 370 and 330 described above, but adapted with the following formulas:

$$P_{2S}'=P_{1S}+DK'\times G \quad \text{(Equation 20.1)}$$

$$V_{2C}'=V_{1C}+DK' \quad \text{(Equation 20.2)}$$

The second node 7 may then determine the next generation of the first node second public key (P2C') and the second node second private key (V2S') similar to steps 430 and 470 described above, but adapted with the following formulas:

$$P_{2C}'=P_{1C}+DK'\times G \quad \text{(Equation 21.1)}$$

$$V_{2S}'=V_{1S}+DK' \quad \text{(Equation 21.2)}$$

The first node 3 and the second node 7 may then each determine the next generation common secret (CS').

In particular, the first node 3 determines the next generation common secret (CS') with the formula:

$$CS'=V_{2C}'\times P_{2S}' \quad \text{(Equation 22)}$$

The second node 7 determines the next generation common secret (CS') with the formula:

$$CS'=V_{2S}'\times P_{2C}' \quad \text{(Equation 23)}$$

Further generations (CS", CS''', etc.) can be calculated in the same way to create a chain hierarchy. This technique requires that both the first node 3 and the second node 7 keep track of the original Message (M) or the originally calculated deterministic key (DK), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys V1C, V1S remain secure.

Tree Structure of Keys

As well as a chain (linear) hierarchy as described above, a hierarchy in the form of a tree structure can be created.

Figure 9:
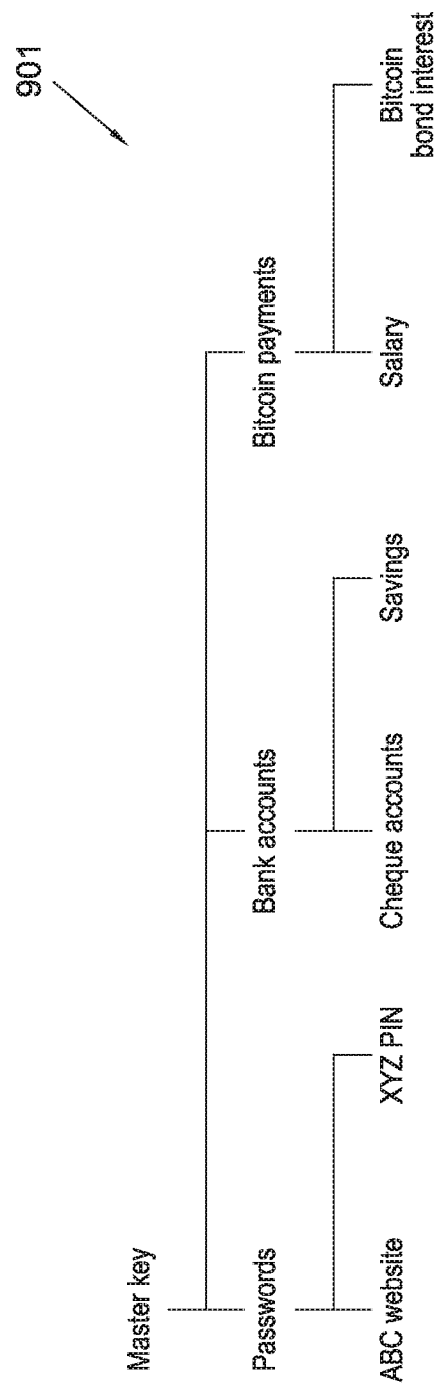
FIG. 9 is an example of a tree structure of different keys for different purposes.

With a tree structure, a variety of keys for different purposes such as authentication keys, encryption keys, signing keys, payment keys, etc. may be determined whereby these keys are all linked to a single securely maintained master key. This is best illustrated in FIG. 9 that shows a tree structure 901 with a variety of different keys. Each of these can be used to create a shared secret with another party.

Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C}=V_{1C}+SHA\text{-}256(M) \quad \text{(Equation 24)}$$

$$V_{2C}'=V_{1C}+SHA\text{-}256(SHA\text{-}256(M)) \quad \text{(Equation 25)}$$

$$V_{2C}''=V_{1C}+SHA\text{-}256(SHA\text{-}256(SHA\text{-}256(M))) \quad \text{(Equation 26)}$$

. . . and so on.

To create a branch, any key can be used as a sub-master key. For example V2C' can be used as a sub-master key (V3C) by adding the hash to it as is done for the regular master key:

$$V_{3C}=V_{2C}'+SHA\text{-}256(M) \quad \text{(Equation 27)}$$

The sub-master key (V3C) may itself have a next generation key (V3C'), for example:

$$V_{3C}'=V_{2C}'+SHA\text{-}256(SHA\text{-}256(M)) \quad \text{(Equation 28)}$$

Figure 10:
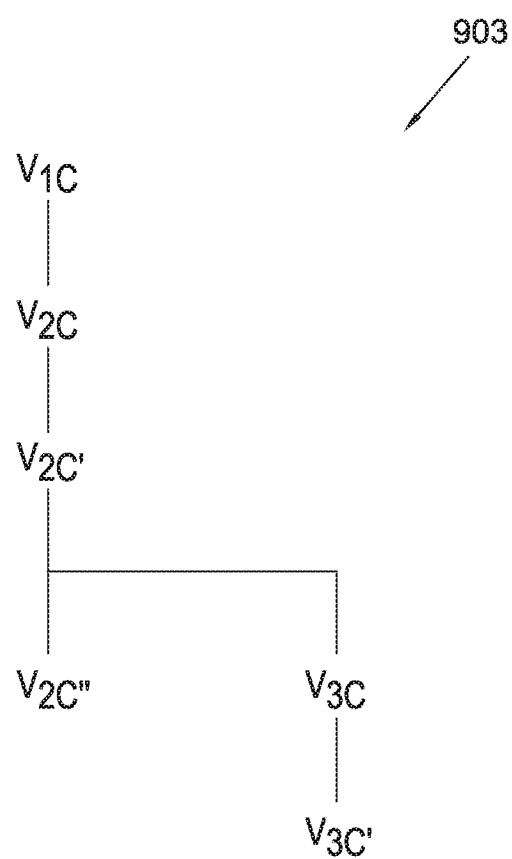
FIG. 10 is an example of a tree structure using the master key spawning method.

This provides a tree structure 903 using the master key spawning method as shown in FIG. 10.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Processing Device

As noted above, the first and second nodes 3, 7 may be an electronic device, such as a computer, tablet computer, mobile communication device, computer server etc. The electronic device may include a processing device 23, 27, a data store 13, 17 and a user interface 15.

Figure 11:
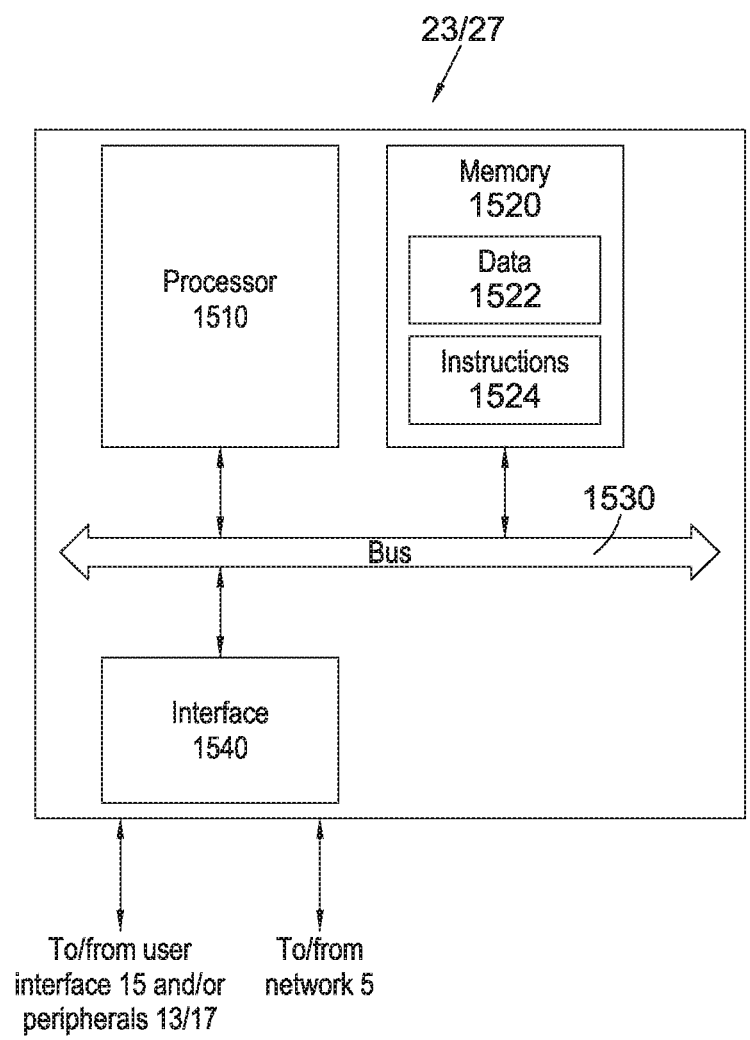
FIG. 11 illustrates a schematic of an example processing device.

FIG. 11 illustrates an example of a processing device 23, 27. The processing device 23, 27 may be used at the first node 3, second node 7 or other nodes 9. The processing device 23, 27 includes a processor 1510, a memory 1520 and an interface device 1540 that communicate with each other via a bus 1530. The memory 1520 stores instructions and data for implementing the method 100, 200, 300, 400 described above, and the processor 1510 performs the instructions from the memory 1520 to implement the method 100, 200, 300, 400. The interface device 1540, may include a communications module that facilitates communication with the communications network 5 and, in some examples, with the user interface 15 and peripherals such as data store 13, 17, 19. It should be noted that although the processing device 1501 may be independent network elements, the processing device 501 may also be part of another network element. Further, some functions performed by the processing device 1501 may be distributed between multiple network elements. For example, the first node 3 may have multiple processing devices 23 to perform method 100, 300 in a secure local area network associated with the first node 3.

Where this disclosure describes that a user, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

Signing may comprise executing a cryptographic function. The cryptographic function has an input for a clear text and an input for a key, such as a private key. A processor may execute the function to calculate a number or string that can be used as a signature. The signature is then provided together with the clear text to provide a signed text. The signature changes completely if the message text or the key changes by a single bit. While calculating the signature requires little computational power, recreating a message that has a given signature is practically impossible. This way, the clear text can only be changed and accompanied by a valid signature if the private key is available. Further, other entities can easily verify the signature using the publicly available public key.

In most circumstances, encrypting and decrypting comprises a processor executing a cryptographic function to calculate an output string representing the encrypted message or a clear text message respectively.

Keys, tokens, metadata, transactions, offers, contracts, signatures, scripts, metadata, invitations, and the like refer to data represented as numbers, text or strings stored on data memory, such as variables in program code of type "string" or "int" or other types or text files.

An example of the peer-to-peer ledger is the bitcoin Blockchain. Transferring funds or paying fees in bitcoin currency comprises creating a transaction on the bitcoin Blockchain with the funds or fees being output from the transaction. An example of a bitcoin transaction includes an input transaction hash, a transaction amount, one or more destinations, a public key of a payee or payees and a signature created by using the input transaction as the input message and a private key of a payer to calculate the signature. The transaction can be verified by checking that the input transaction hash exists in a copy of the bitcoin Blockchain and that the signature is correct using the public key. To ensure that the same input transaction hash has not been used elsewhere already, the transaction is broadcast to a network of computing nodes ('miners'). A miner accepts and records the transaction on the Blockchain only if the input transaction hash is not yet connected and the signatures are valid. A miner rejects the transaction if the input transaction hash is already linked to a different transaction.

Allocating cryptocurrency for a token comprises creating a transaction with the allocated cryptocurrency and the token represented in a metadata field in the transaction.

When two items are associated, this means that there is a logical connection between these items. In a database, for example, identifiers for the two items may be stored in the same records to make the two items associated with each other. In a transaction, identifiers for the two items may be included in the transaction string to make the two items associated with each other.

Using the bitcoin protocol, redeeming a script and/or unlocking a token comprises calculating a signature string of the script and/or transaction using the private key. The script may require more than one signature derived from different private keys or other conditions. The output of this transaction is then provided to a miner.

Authorising another entity may comprise calculating a signature string of a transaction using a private key and providing the signature string to the entity to allow the entity to use the signature to verify the transaction.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

The skilled person will appreciate that the present invention provides numerous technical benefits and advantages over the prior art. For example, the BIP32 protocol (e.g. as described in the Bitcoin developer's guide) uses a random seed to generate the sub-keys. This gives rise to a need to maintain a database of indices. In accordance with the present invention, however, a meaningful message M is used to generate the sub-keys (and therefore also the sub-shared secrets). Advantageously, this obviates the need for a database of indices, and thus provides a simpler security technique which is more efficient in terms of the computing resources needed to execute it. Additionally, it enables the association of meaningful information with the sub-keys. For example, reusable sub-keys may be used to represent specific bank accounts or client codes, etc. Alternatively, once-only sub-keys may be generated based on hashing a specific invoice or movie (or other data) file etc.

It will be appreciated by persons skilled in the art that numerous variations and/or modifications may be made to the above-described embodiments, without departing from the broad general scope of the present disclosure as defined by the appended claims. The present embodiments are, therefore, to be considered in all respects as illustrative and not restrictive.

What is claimed is:

1. A computer-implemented method of determining, at a first node (C), a common secret (CS) that is common with the first node (C) and a second node (S), wherein the first node (C) is associated with a first asymmetric cryptography pair of a cryptography system, the first asymmetric cryptography pair having a first node master private key ($V_{1C}$) and a first node master public key ($P_{1C}$), and the second node (S) is associated with a second asymmetric cryptography pair of the cryptography system, the second asymmetric cryptography pair having a second node master private key ($V_{1S}$) and a second node master public key ($P_{1S}$), wherein the first node master public key and second node master public key are generated respectively from the first node master private key and the second node master private key using the cryptography system common with the first and second nodes, and wherein the method comprises:
   determining a first node second private key ($V_{2C}$) based on at least the first node master private key ($V_{1C}$) and a deterministic key (DK) common with the first and second nodes;
   determining a second node second public key ($P_{2S}$) based on at least the second node master public key ($P_{1S}$) and the deterministic key (DK) using the common cryptography system; and
   determining the common secret (CS) based on the first node second private key ($V_{2C}$) and the second node second public key ($P_{2S}$),
   wherein the second node (S) has the same common secret (S) based on a first node second public key ($P_{2C}$) and a second node second private key ($V_{2S}$), wherein:
   the first node second public key ($P_{2C}$) is based on at least the first node master public key ($P_{1C}$) and the deterministic key (DK) using the common cryptography system; and
   the second node second private key ($V_{2S}$) is based on at least the second node master private key ($V_{1S}$) and the deterministic key (DK).

2. The method according to claim 1, wherein the deterministic key (DK) is based on a message (M).

3. The method according to claim 2, further comprising:
   generating a first signed message (SM1) based on the message (M) and the first node second private key ($V_{2C}$); and
   sending, over the communications network, the first signed message (SM1) to the second node (S),
   wherein the first signed message (SM1) can be validated with a first node second public key ($P_{2C}$) to authenticate the first node (C).

4. The method according to claim 2, further comprising:
   receiving, over the communications network, a second signed message (SM2) from the second node (S);
   validating the second signed message (SM2) with the second node second public key (P2S); and
   authenticating the second node (S) based on the result of validating the second signed message (SM2),
   wherein the second signed message (SM2) was generated based on the message (M), or a second message (M2), and the second node second private key ($V_{2S}$).

5. The method according to claim 2, further comprising:
   generating a message (M); and
   sending, over a communications network, the message (M) to the second node (S).

6. The method according to claim 2, further comprising:
   receiving the message (M), over the communications network, from the second node (S).

7. The method according to claim 2, further comprising:
   receiving the message (M), over the communications network, from another node.

8. The method according to claim 2, further comprising:
   receiving the message (M) from a data store, and/or an input interface associated with the first node (C).

9. The method according to claim 1, wherein the cryptography system is an elliptic curve cryptography (ECC) system and the first node master public key ($P_{1C}$) and second node master public key ($P_{1S}$) are based on elliptic curve point multiplication of respective first node master private key ($V_{1C}$) and second node master private key ($V_{1S}$) and a generator (G).

10. The method according to claim 1, further comprising the steps of:
    receiving, over the communications network, the second node master public key ($P_{1S}$); and
    storing, at a data store associated with the first node (C), the second node master public key ($P_{1S}$).

11. The method according to claim 1, further comprising the steps of:
    generating, at a first node (C), the first node master private key ($V_{1C}$) and the first node master public key ($P_{1C}$);
    sending, over the communications network, the first node master public key ($P_{1C}$) to the second node (S) and/or other node; and
    storing, in a first data store associated with the first node (C), the first node master private key ($V_{1C}$).

12. The method according to claim 11, further comprising:
    sending, over the communications network, to the second node, a notice indicative of using a common cryptography system for the method of determining a common secret (CS), and
    wherein the step of generating the first node master private key ($V_{1C}$) and the first node master public key ($P_{1C}$) comprises:
    generating the first node master private key ($V_{1C}$) based on a random integer in an allowable range specified in the common cryptography system; and
    determining the first node master public key ($P_{1C}$) from the first node master private key ($V_{1C}$) using the common cryptography system.

13. The method according to claim 12, wherein the common cryptography system is an elliptic curve cryptography (ECC) system with a common generator (G) and the first node master public key ($P_{1C}$) is determined based on elliptic curve point multiplication of the first node master private key ($V_{1C}$) and the common generator (G) according to the following formula:

$$P_{1C} = V_{1C} \times G.$$

14. The method according to claim 13, further comprising:
    determining the deterministic key (DK) based on determining a hash of the message (M), and
    wherein the step of determining a first node second private key (V2C) is based on a scalar addition of the first node master private key ($V_{1C}$) and the deterministic key (DK) according to the following formula:

$$V_{2C} = V_{1C} + DK, \text{ and}$$

wherein the step of determining a second node second public key (P2S) is based on the second node master public key ($P_{1S}$) with elliptic curve point addition to the elliptic curve point multiplication of the deterministic key (DK) and the common generator (G) according to the following formula:

$$P_{2S}=P_{1S}+DK\times G.$$

15. The method according to claim 1, wherein the deterministic key (DK) is based on determining a hash of a previous deterministic key.

16. The method according to claim 1, wherein the first asymmetric cryptography pair and the second asymmetric cryptography pair are based on a function of respective previous first asymmetric cryptography pair and previous second asymmetric cryptography pair.

17. A method of secure communication between a first node and a second node with symmetric-key algorithm, wherein the method comprises:
   determining a common secret by means of a method according to claim 1;
   determining a symmetric-key based on the common secret;
   encrypting a first communication message, with the symmetric-key, to an encrypted first communication message; and
   sending, over a communications network, the encrypted first communication message from the first node (C) to the second node (S).

18. The method according to claim 17, wherein the method further comprises:
   receiving, over a communications network, an encrypted second communication message from the second node (S); and
   decrypting the encrypted second communication message, with the symmetric-key, to a second communication message.

19. A method of performing an online transaction between a first node and a second node, wherein the method comprises:
   determining a common secret by means of a method according to claim 1;
   determining a symmetric-key based on the common secret;
   encrypting a first transaction message, with the symmetric-key, to an encrypted first transaction message;
   sending, over a communications network, the encrypted first transaction message from the first node (C) to the second node (S);
   receiving, over a communications network, an encrypted second transaction message from the second node (S); and
   decrypting the encrypted second transaction message, with the symmetric-key, to a second transaction message.

20. A device for determining, at a first node (C), a common secret (CS) that is common with a second node (S), wherein the first node (C) is associated with a first asymmetric cryptography pair having a first node master private key ($V_{1C}$) and a first node master public key ($P_{1C}$), and the second node (S) is associated with a second asymmetric cryptography pair having a second node master private key ($V_{1S}$) and a second node master public key ($P_{1S}$), wherein the device comprises a first processing device to perform the method according to claim 1 to determine the common secret.

21. The device according to claim 20, further comprising a first data store to store one or more of the first node master private key ($V_{1C}$).

22. The device according to claim 21, wherein the first data store further stores one or more of the first node master public key ($P_{1C}$), the second node master public key ($P_{1S}$), and the message (M).

23. The device according to claim 20, further comprising a communications module to send and/or receive, over a communications network, one or more of the message (M), the first node master public key ($P_{1C}$), the second node master public key ($P_{1S}$), the first signed message (SM1), the second signed message (SM2), the notice indicative of using a common cryptography system.

24. The device according to claim 23, wherein the common cryptography system is an elliptic curve cryptography (ECC) system with a common generator (G).

25. A device for secure communication, or performing a secure online transaction between a first node and a second node, wherein the device includes a first processing device to:
   perform the method according to claim 17.

26. A system for determining a common secret between a first node (C) and a second node (S), wherein:
   the first node (C) is associated with a first asymmetric cryptography pair of a cryptography system, the first asymmetric cryptography pair having a first node master private key ($V_{1C}$) and a first node master public key ($P_{1C}$); and
   the second node (S) is associated with a second asymmetric cryptography pair of the cryptography system, the second asymmetric cryptography pair having a second node master private key ($V_{1S}$) and a second node master public key ($P_{1S}$), wherein the first node master public key and second node master public key are generated respectively from the first node master private key and the second node master private key using the cryptography system common with the first and second nodes, and the system comprising:
   a first processing device, associated with the first node (C), configured to:
      determine a first node second private key ($V_{2C}$) based on at least the first node master private key ($V_{1C}$) and a deterministic key (DK) common with the first and second nodes;
      determine a second node second public key ($P_{2S}$) based on at least the second node master public key ($P_{1S}$) and the deterministic key (DK) using the common cryptography system; and
      determine the common secret (CS) based on the first node second private key ($V_{2C}$) and the second node second public key ($P_{2S}$); and
   a second processing device, associated with the second node (S), configured to:
      determine a first node second public key ($P_{2C}$) based on at least the first node master public key ($P_{1C}$) and the deterministic key (DK) using the common cryptography system;
      determine a second node second private key ($V_{2S}$) based on at least the second node master private key ($V_{1S}$) and the deterministic key (DK); and
      determine the common secret based on the first node second public key ($P_{2C}$) and the second node second private key ($V_{2S}$),
   wherein the first processing device and the second processing device determine the same common secret.

27. The system according to claim 26, wherein the deterministic key (DK) is based on a message (M), and the first processing device is further configured to:

generate a first signed message (SM1) based on the message (M) and the first node second private key ($V_{2C}$); and
send, over the communications network, the first signed message (SM1) to the second node (S),
wherein the second processing device is further configured to:
receive the first signed message (SM1);
validate the first signed message (SM1) with the first node second public key ($P_{2C}$); and
authenticate the first node (C) based on a result of the validated first signed message (SM1).

28. The system according to claim 26, wherein the second processing device is further configured to:
generate a second signed message (SM2) based on the message (M), or a second message (M2), and the second node second private key ($V_{2S}$); and
send the second signed message (SM2) to the first node (C),
wherein the first processing device is further configured to:
receive the second signed message (SM2);
validate the second signed message (SM2) with the second node second public key ($P_{2S}$); and
authenticate the second node (S) based on a result of the validated second signed message (SM2).

29. The system according to claim 26, wherein the first processing device is configured to:
generate the message (M); and
send the message (M),
wherein the second processing device is configured to:
receive the message (M).

30. The system according to claim 26, wherein the message is generated by another node, wherein the first processing device is configured to:
receive the message (M),
wherein the second processing device is configured to:
receive the message (M).

31. The system according to claim 26, further comprising a system data store and/or input interface, wherein the first processing device and second processing device receives the message (M), or the second message (M2) from the system data store and/or input interface.

32. The system according to claim 31, wherein the first processing device receives the second node master public key ($P_{1S}$) from the system data store and/or input device, and the second processing device receives the first node master public key ($P_{1C}$) from the system data store and/or input device.

33. The system according to claim 26, wherein the cryptography system is an elliptic curve cryptography (ECC) system and the first node master public key ($P_{1C}$) and second node master public key ($P_{1S}$) are based on elliptic curve point multiplication of respective first node master private key ($V_{1C}$) and second node master private key ($V_{1S}$) and a generator (G).

34. The system according to claim 26, further comprising:
a first data store associated with the first node (C) to store the first node master private key ($V_{1C}$); and
a second data store associated with the second node (S) to store the second node master private key ($V_{1S}$).

35. The system according to claim 34, wherein the first processing device is configured to:
generate the first node master private key ($V_{1C}$) and the first node master public key ($P_{1C}$);
send the first node master public key ($P_{1C}$); and
store the first node master private key ($V_{1C}$) in the first data store,
wherein the second processing device is configured to:
generate the second node master private key ($V_{1S}$) and the second node master public key ($P_{1S}$);
send the second node master public key ($P_{1S}$); and
store the second node master private key ($V_{1S}$) in the second data store.

36. The system according to claim 34, wherein:
the first data store receives and stores the second node master public key ($P_{1S}$); and
the second data store receives and stores the first node master public key ($P_{1C}$).

37. The system according to claim 26, wherein the first processing device is further configured to:
generate the first node master private key ($V_{1C}$) based on a random integer in an allowable range specified in a common cryptography system; and
determine the first node master public key ($P_{1C}$) based on the first node master private key ($V_{1C}$) using the common cryptography system,
and wherein the second processing device is further configured to:
generate the second node master private key ($V_{1S}$) based on a random integer in the allowable range specified in the common cryptography system; and
determine the second node master public key ($P_{1S}$) based on the second node master private key ($V_{1S}$) using the common cryptography system.

38. The system according to claim 37, wherein the common cryptography system is an elliptic curve cryptography (ECC) system with a common generator (G), wherein the first processing device is further configured to:
determine the first node master public key ($P_{1C}$) based on elliptic curve point multiplication of the first node master private key ($V_{1C}$) and the common generator according to the formula:

$$P_{1C}=V_{1C} \times G$$

and wherein the second processing device is further configured to:
determine the second node master public key ($P_{1S}$) based on elliptic curve point multiplication of the second node master private key ($V_{1S}$) and the common generator according to the formula:

$$P_{1S}=V_{1S} \times G.$$

39. The system according to claim 26, wherein the first processing device is configured to:
determine the deterministic key (DK) based on a hash of the message (M), and wherein:
the first node second private key ($V_{2C}$) is based on a scalar addition of the first node master private key ($V_{1C}$) and the deterministic key (DK) according to the formula:

$$V_{2C}=V_{1C}+DK; \text{ and}$$

the second node public key ($P_{2S}$) is based on the second node master public key ($P_{1S}$) with elliptic curve point addition to the elliptic curve point multiplication of the deterministic key (DK) and the common generator (G) according to the following formula:

$$P_{2S}=P_{1S}+DK \times G$$

and wherein the second processing device is configured to:
determine the deterministic key (DK) based on a hash of the message (M), and wherein:

the second node second private key ($V_{2S}$) is based on a scalar addition of the second node master private key ($V_{1S}$) and the deterministic key (DK) according to the formula:

$$V_{2S}=V_{1C}+DK; \text{ and}$$

the first node public key ($P_{2C}$) is based on the first node master public key ($P_{1C}$) with elliptic curve point addition to the elliptic curve point multiplication of the deterministic key (DK) and the common generator (G) according to the following formula:

$$P_{2C}=P_{1C}+DK \times G.$$

40. The system according to claim 26, further comprising:
a first communications module associated with the first processing device to send and/or receive, over a communications network, one or more of the message (M), the first node master public key ($P_{1C}$), the second node master public key ($P_{1S}$), the first signed message (SM1), the second signed message (SM2), and a notice indicative of using a common cryptography system; and
a second communications module associated with the second processing device to send and/or receive, over a communications network, one or more of the message (M), the first node master public key ($P_{1C}$), the second node master public key ($P_{1S}$), the first signed message (SM1), the second signed message (SM2), and the notice indicative of using a common cryptography system.

41. The system according to claim 40, wherein the common cryptography system is an elliptic curve cryptography (ECC) system with a common generator (G).

42. The system according to claim 26, wherein the deterministic key (DK) is based on determining a hash of a previous deterministic key.

43. The method according to claim 26, wherein the first asymmetric cryptography pair and the second asymmetric cryptography pair are based on a function of respective previous first asymmetric cryptography pair and previous second asymmetric cryptography pair.

44. A system for secure communication between a first node and a second node with symmetric-key algorithm, wherein the system comprises:
a system according to claim 26 to determine a common secret with the first processing device and the second processing device, wherein the first processing device is further configured to:
determine a symmetric-key based on the common secret;
encrypt a first communication message, with the symmetric-key, to an encrypted first communication message; and
send the encrypted first communication message;
wherein the second processing device is further configured to:
determine the same symmetric-key based on the common secret;
receive the encrypted first communication message; and
decrypt the encrypted first communication message, with the symmetric-key, to the first communication message.

45. A system for secure communication between a first node and a second node with symmetric-key algorithm, wherein the second processing device is further configured to:
encrypt a second communication message, with the symmetric-key, to the encrypted second communication message; and
send the encrypted second communication message;
wherein the first processing device is further configured to:
receive the encrypted second communication message; and
decrypt the encrypted second communication message, with the symmetric-key, to the second communication message.

46. The system according to claim 44, wherein the first and second communication messages are transaction messages between the first node and second node for an online transaction between the first node and the second node.

47. A computer program comprising machine-readable instructions to cause a processing device to implement the method according to claim 1.

* * * * *